United States Patent
Suzuki et al.

(10) Patent No.: US 11,965,247 B2
(45) Date of Patent: Apr. 23, 2024

(54) PRETREATMENT AGENT AND CHEMICAL CONVERSION TREATMENT AGENT

(71) Applicant: Nihon Parkerizing Co., Ltd., Tokyo (JP)

(72) Inventors: Amane Suzuki, Tokyo (JP); Tomohiro Iko, Tokyo (JP); Hidekazu Fukushi, Tokyo (JP)

(73) Assignee: Nihon Parkerizing Co., Ltd., Tokyo (JP)

(*) Notice: Subject to any disclaimer, the term of this patent is extended or adjusted under 35 U.S.C. 154(b) by 804 days.

(21) Appl. No.: 16/757,841

(22) PCT Filed: Jul. 20, 2018

(86) PCT No.: PCT/JP2018/027216
§ 371 (c)(1),
(2) Date: Apr. 21, 2020

(87) PCT Pub. No.: WO2019/087475
PCT Pub. Date: May 9, 2019

(65) Prior Publication Data
US 2021/0172068 A1   Jun. 10, 2021

(30) Foreign Application Priority Data
Oct. 31, 2017 (JP) ............... 2017-211422

(51) Int. Cl.
*C23C 22/80* (2006.01)
*B05D 7/14* (2006.01)
*C23C 22/06* (2006.01)

(52) U.S. Cl.
CPC ............ *C23C 22/80* (2013.01); *B05D 7/14* (2013.01); *C23C 22/06* (2013.01)

(58) Field of Classification Search
None
See application file for complete search history.

(56) References Cited

U.S. PATENT DOCUMENTS

| | | | |
|---|---|---|---|
| 6,761,932 B2 * | 7/2004 | Salter | C23C 18/1241 427/407.1 |
| 2003/0051773 A1 | 3/2003 | Dolan | |
| 2004/0244648 A1 * | 12/2004 | Akui | C23C 26/00 106/287.19 |
| 2012/0091398 A1 | 4/2012 | Hofmann et al. | |
| 2013/0210229 A1 * | 8/2013 | Ogihara | G03F 7/0751 438/694 |
| 2014/0302325 A1 | 10/2014 | Shimada et al. | |
| 2016/0244884 A1 | 8/2016 | Kudo et al. | |
| 2019/0071781 A1 * | 3/2019 | Murahashi | C23C 22/76 |

FOREIGN PATENT DOCUMENTS

| | | | |
|---|---|---|---|
| CN | 105814236 A | 7/2016 | |
| JP | 2009-41077 A | 2/2009 | |
| JP | 2009-161840 A | 7/2009 | |
| JP | 2010-090409 A | 4/2010 | |
| JP | 2011-088083 A | 5/2011 | |
| JP | 2012/531527 A | 12/2012 | |
| JP | 2015110313 A * | 6/2015 | |
| TW | 201321452 A | 6/2013 | |
| WO | WO-2010/070729 A1 | 6/2010 | |
| WO | WO-2010-070730 A1 | 6/2010 | |
| WO | WO-2017163446 A1 * | 9/2017 | ............... C08K 3/30 |

OTHER PUBLICATIONS

JP2015110313A—English translation (Year: 2015).*
Office Action in CN Application No. 201880066953.4 dated Jul. 5, 2021, 15 pages.
Extended European Search Report in EP Application No. 18872486.8 dated Jul. 5, 2021, 8 pages.
Office Action in TW Application No. 107125249 dated Jul. 19, 2021, 15 pages.
International Preliminary Report on Patentability and Written Opinion in International Application No. PCT/JP2018/027216 dated May 14, 2020, 8 pages.
Office Action in JP Application No. 2019-549849 dated May 11, 2011, 12 pages.
Search Report in International Application No. PCT/JP2018/027216 dated Oct. 16, 2018, 4 pages.

* cited by examiner

*Primary Examiner* — Stefanie J Cohen
(74) *Attorney, Agent, or Firm* — MARSHALL, GERSTEIN & BORUN LLP

(57) ABSTRACT

The present invention addresses the problem of providing, a metal surface treatment agent capable of exhibiting excellent corrosion resistance and excellent coating adhesion in painted metal materials; and a metal surface treatment method using the metal surface treatment agent. The problem is solved by a pretreatment agent that is used in a pretreatment of a chemical conversion treatment performed for forming a chemical conversion coating on/over a surface of a metal material, the pretreatment agent containing: a metal alkoxide (A) containing at least one metal element selected from zirconium, titanium, vanadium, and aluminum; and at least one sulfonic acid (B) selected from methanesulfonic acid, ethanesulfonic acid, hydroxymethanesulfonic acid, and hydroxyethanesulfonic acid. The problem is also solved by a chemical conversion treatment agent that contains a zirconium alkoxide (a) and a zirconium-containing ion supply source (b), and has a pH of 1.5 to 6.5.

7 Claims, No Drawings

PRETREATMENT AGENT AND CHEMICAL CONVERSION TREATMENT AGENT

TECHNICAL FIELD

The present invention relates to: a pretreatment agent that is used in a pretreatment of a chemical conversion treatment performed for forming a chemical conversion coating on/over a surface of a metal material; a chemical conversion treatment agent; a metal material including a film formed by the pretreatment agent and/or a chemical conversion coating formed by the chemical conversion treatment agent, and a method of producing the same; and a metal material including a chemical conversion coating and a paint film, and a method of producing the same.

BACKGROUND ART

Conventionally, a variety of chemical conversion treatment agents and base treatment agents have been developed for improvement of the corrosion resistance of metal materials. For example, Patent Document 1 proposed a technology that relates to a solution composition of a metal surface treatment agent containing zirconium as a main component.

RELATED ART DOCUMENT

Patent Document

[Patent Document 1] Japanese Unexamined Patent Application Publication No. 2009-41077

SUMMARY OF THE INVENTION

Problems to be Solved by the Invention

However, in those metal materials having a chemical conversion coating obtained by treating a metal surface with the solution composition disclosed in Patent Document 1, even when a paint film is formed thereon by coating, there are cases where the resulting painted metal materials do not exhibit sufficient corrosion resistance at their edges or the adhesion of the paint film is not sufficient. In addition, depending on the type of the metal material, there are also cases where a chemical conversion coating having sufficient corrosion resistance is not obtained or a paint film formed on the chemical conversion coating does not exhibit sufficient adhesion. Therefore, an object of the present invention is to provide technologies of, for example: a metal surface treatment agent capable of exhibiting excellent corrosion resistance and excellent paint film adhesion on a painted metal material; and a metal surface treatment method using the metal surface treatment agent. More particularly, an object of the present invention is to provide technologies of, for example: a pretreatment agent of a chemical conversion treatment that can yield a chemical conversion coating, which pretreatment agent is capable of not only improving the corrosion resistance of edge burrs when a paint film is formed but also improving the adhesion of the edge burrs with the paint film; and a pretreatment method of a chemical conversion treatment, which uses the pretreatment agent. Another object of the present invention is to provide technologies of, for example: a chemical conversion treatment agent which not only is useful in a metal material production method to which the pretreatment method is applied, but also can impart a metal material with excellent corrosion resistance regardless of the type of the metal material; and a chemical conversion treatment method using the chemical conversion treatment agent.

Means for Solving the Problems

The present inventors intensively studied to solve the above-described problems and consequently discovered that, by performing a pretreatment of a metal material with a specific pretreatment agent prior to performing a chemical conversion treatment on/over a surface of the metal material, burrs on the edges of the metal material having a paint film formed after the chemical conversion treatment are allowed to exhibit excellent corrosion resistance, and the paint film is provided with excellent adhesiveness. The present inventors also discovered that the use of a specific metal surface treatment agent not only is useful in a metal material production method to which the above-described pretreatment is applied but also can impart a metal material with excellent corrosion resistance regardless of the type of the metal material. The present inventors completed the present invention in this manner.

That is, the present invention provides the following (I) to (XVII).

(I) A pretreatment agent, used as an agent in a pretreatment of a chemical conversion treatment performed for forming a chemical conversion coating on/over a surface of a metal material,
comprising:
a metal alkoxide (A) containing at least one metal element selected from the group consisting of zirconium, titanium, vanadium, and aluminum; and
at least one sulfonic acid (B) selected from the group consisting of methanesulfonic acid, ethanesulfonic acid, hydroxymethanesulfonic acid, and hydroxyethanesulfonic acid.

(II) The pretreatment agent according to (I), further comprising at least one alkoxysilyl group-containing organosilane compound (C).

(III) A method of producing a metal material, the method comprising a pretreatment step of contacting the pretreatment agent according to (I) or (II) on/over a surface of a metal material.

(IV) The method of producing a metal material according to (III), the method further comprising, after the pretreatment step, a chemical conversion treatment step of forming a chemical conversion coating over the surface of the metal material.

(V) A metal material including a chemical conversion coating, which is obtained by the method according to (IV).

(VI) A method of producing a painted metal material, the method comprising, after the chemical conversion treatment step according to (IV), a painting step of coating the metal material.

(VII) A painted metal material, comprising a paint film on a surface of the metal material including a chemical conversion coating according to (V).

(VIII) A chemical conversion treatment agent, comprising a zirconium alkoxide (a) and a zirconium-containing ion supply source (b), and having a pH of 1.5 to 6.5.

(IX) The chemical conversion treatment agent according to (VIII), further containing a fluorine-containing ion supply source (c).

(X) The chemical conversion treatment agent according to (VIII) or (IX), wherein a ratio $[a_M/b_M]$ of a zirconium-equivalent molar concentration $(a_M)$ of the zirconium alkoxide (a) to a zirconium-equivalent molar concentration ($b_M$) of the zirconium-containing ion supply source (b) is 0.01 to 10.

(XI) The chemical conversion treatment agent according to any one of (VIII) to (X), further comprising an alkoxysilyl group-containing organosilane compound (d).

(XII) The chemical conversion treatment agent according to any one of (VIII) to (XI), further containing a supply source (f) of at least one ion selected from a nitrate ion and a sulfate ion.

(XIII) A method of producing a metal material having a chemical conversion coating, the method comprising a chemical conversion treatment step of contacting the chemical conversion treatment agent according to any one of (VIII) to (XII) on/over a surface of a metal material.

(XIV) The method according to (XIII), further having, prior to the chemical conversion treatment step, the pretreatment step of contacting the pretreatment agent according to (I) or (II) on/over the surface of the metal material.

(XV) A metal material, including a chemical conversion coating formed by the method according to (XIII) or (XIV).

(XVI) A method of producing a painted metal material, the method comprising, after the chemical conversion treatment step according to (XIII) or (XIV), a painting step of coating the metal material.

(XVII) A painted metal material, including a paint film over a surface of the metal material including a chemical conversion coating according to (XV).

Effects of the Invention

According to the present invention, technologies of: for example, a pretreatment agent of a chemical conversion treatment that can yield a chemical conversion coating, which pretreatment agent is capable of not only improving the corrosion resistance of edge burrs when a paint film is formed but also improving the adhesion of the edge burrs with the paint film; and a pretreatment method of a chemical conversion treatment, which uses the pretreatment agent, can be provided.

In addition, technologies of, for example: a chemical conversion treatment agent which not only is useful in a metal material production method to which the pretreatment method is applied, but also can impart a metal material with excellent corrosion resistance regardless of the type of the metal material; and a metal surface treatment method using the chemical conversion treatment agent can be provided as well.

Embodiment

The pretreatment agent according to one embodiment of the present invention is a pretreatment agent that is used in a pretreatment of a chemical conversion treatment performed for forming a chemical conversion coating on/over a surface of a metal material, the pretreatment agent containing: a metal alkoxide (A) containing at least one metal element selected from zirconium, titanium, vanadium, and aluminum; and at least one sulfonic acid (B) selected from methanesulfonic acid, ethanesulfonic acid, hydroxymethanesulfonic acid, and hydroxyethanesulfonic acid.

The pretreatment agent of the present embodiment, a method of producing the pretreatment agent, a method of performing a pretreatment of a metal material with the pretreatment agent, a chemical conversion treatment method performed after the pretreatment, a metal material including a chemical conversion coating formed by the chemical conversion treatment method, a chemical conversion treatment agent used in the chemical conversion treatment method, and the like will now be described. It is noted here that the present invention can be arbitrarily modified within a range not departing from the gist of the present invention, and is not restricted to the below-described embodiments.

1. Pretreatment Agent

The pretreatment agent of the present embodiment may be obtained by adding a metal alkoxide (A) containing at least one metal element selected from zirconium, titanium, vanadium and aluminum, and at least one sulfonic acid (B) selected from methanesulfonic acid, ethanesulfonic acid, hydroxymethanesulfonic acid and hydroxyethanesulfonic acid to a liquid medium, and other component(s) may further be incorporated as well. Examples of the other components include additives such as an alkoxysilyl group-containing organosilane compound (C), a pH modifier, a surfactant for adjusting the wettability of a material to be treated, and a surfactant referred to as antifoaming agent.

A metal element contained in the metal alkoxide (A) containing at least one metal element selected from zirconium, titanium, vanadium and aluminum (hereinafter, also simply referred to as "metal alkoxide (A)" is selected from the group consisting of zirconium, titanium, vanadium and aluminum, and the metal alkoxide (A) may contain any one of, or two or more of these metal elements. Examples of a combination of these two or more metal elements include: zirconium and titanium; zirconium and vanadium; zirconium and aluminum; titanium and vanadium; titanium and aluminum; vanadium and aluminum; zirconium, titanium, and vanadium; zirconium, titanium, and aluminum; titanium, vanadium, and aluminum; and zirconium, titanium, vanadium, and aluminum. In the pretreatment agent, the metal alkoxide (A) may be contained as is, or exist in the form of a hydrolysate resulting from hydrolysis of the metal alkoxide (A), in the form of a polycondensate resulting from polycondensation of the hydrolysate, or in the form of a combination of a plurality of these forms.

The metal alkoxide (A) is a substance having a structure in which a metal atom and an oxygen atom of an alkoxy group are bound with each other. The structure may have two or more kinds of metal elements in one molecule and, in such a case, the metal elements may be the same or different. The hydrocarbon group of the alkoxy group is preferably a hydrocarbon group having 1 to 10 carbon atoms, more preferably a hydrocarbon group having 2 to 8 carbon atoms. Examples of the metal alkoxide (A) include, but not limited to, zirconium tetrapropoxide, zirconium tetraisopropoxide, zirconium tetra-n-propoxide, zirconium tetra-n-butoxide, titanium methoxide, titanium ethoxide, titanium tetraisopropoxide, titanium tetra-n-butoxide, titanium butoxide dimer, titanium tetra-2-ethylhexoxide, triisopropoxide vanadium (V) oxide, vanadium butoxide, triethoxyvanadium (V) oxide, aluminum isopropoxide, aluminum-tert-butoxide, and aluminum tri-sec-butoxide. These compounds may be used singly, or in combination of two or more thereof.

The amount of the metal alkoxide (A) to be contained in the pretreatment agent is not particularly restricted; however, it is usually not less than 0.01 mmol/L, preferably not less than 0.05 mmol/L, but usually 2.0 mmol/L or less, in terms of metal-equivalent molar concentration.

As the at least one sulfonic acid (B) selected from methanesulfonic acid, ethanesulfonic acid, hydroxymethanesulfonic acid and hydroxyethanesulfonic acid (hereinafter, also referred to as "sulfonic acid component (B)"), one selected from the above-described sulfonic acids may be used singly, or two or more selected from the above-described sulfonic acids may be used in combination.

When the metal-equivalent molar concentration of the metal alkoxide (A) is defined as $[A_M]$ and the molar concentration of the sulfonic acid contained in the pretreatment agent is defined as $[B_M]$, the molar concentration ratio $[B_M]/[A_M]$ is preferably 2.0 or higher, more preferably 2.5 or higher. By controlling the value of $[B_M]/[A_M]$ to be 2.0 or higher, the generation of a precipitate in the pretreatment agent can be inhibited. Further, an upper limit value of $[B_M]/[A_M]$ is not particularly restricted; however, it is preferably not higher than 10.0 from the standpoint of the cost of the pretreatment agent.

The pretreatment agent preferably contains at least one alkoxysilyl group-containing organosilane compound (C) (hereinafter, also referred to as "organosilane compound (C)"). In the pretreatment agent, the organosilane compound (C) may be contained as is, or exist in the form of a hydrolysate resulting from hydrolysis of the organosilane compound (C), in the form of a polycondensate resulting from polycondensation of the hydrolysate, in the form of a copolymer (e.g., an alternating copolymer, a random copolymer, a block copolymer, or a graft copolymer) obtained by copolymerization of a hydrolysate resulting from hydrolysis of the metal alkoxide (A) and a hydrolysate resulting from hydrolysis of the organosilane compound (C), or in the form of a combination of a plurality of these forms. The organosilane compound (C) is not particularly restricted as long as it is an organosilane compound containing an alkoxysilyl group in the molecule. The organosilane compound (C) may also contain, as other functional group, for example, a vinyl group, a glycidyl group, a styryl group, a methacryl group, an acryl group, an amino group, a ureido group, a mercapto group, or an isocyanate group. From the standpoints of the adhesion of the resulting paint film and the corrosion resistance, it is preferred to use an organosilane compound that has an alkoxysilyl group as well as an amino group or a glycidyl group in the molecule.

The organosilane compound (C) is not particularly restricted as long as it contains an alkoxysilyl group in the molecule and, when the organosilane compound (C) has a glycidyl group, examples of the organosilane compound (C) include 3-glycidoxypropylmethyldimethoxysilane, 3-glycidoxypropyldimethylmethoxysilane, 3-glycidoxypropyltrimethoxysilane, 3-glycidoxypropylethyldiethoxysilane, 3-glycidoxypropyldiethylethoxysilane, 3-glycidoxypropyltriethoxysilane, 2-(3,4-epoxycyclohexyl)ethyltrimethoxysilane, and 2-(3,4-epoxycyclohexyl)ethyltrimethoxysilane. When the organosilane compound has an amino group, examples of the organosilane compound (C) include N-2-(aminoethyl)-3-aminopropyldimethylmethoxysilane, N-2-(aminoethyl)-3-aminopropylmethyldimethoxysilane, N-2-(aminoethyl)-3-aminopropyltrimethoxysilane, N-2-(aminoethyl)-3-aminopropyldiethylethoxysilane, N-2-(aminoethyl)-3-aminopropylethyldiethoxysilane, N-2-(aminoethyl)-3-aminopropyltriethoxysilane, 3-aminopropyldimethylmethoxysilane, 3-aminopropylmethyldimethoxysilane, 3-aminopropyltrimethoxysilane, 3-aminopropyldiethylethoxysilane, 3-aminopropylethyldiethoxysilane, 3-aminopropyltriethoxysilane, N-phenyl-3-aminopropyltrimethoxysilane, and 3-triethoxysilyl-N-(1,3-dimethyl-butylidene)propylamine. Other examples of the organosilane compound (C) include tetramethyl orthosilicate, tetraethyl orthosilicate, methyltrimethoxysilane, dimethyldimethoxysilane, trimethylmethoxysilane, trimethylethoxysilane, dimethyldiethoxysilane, ethyltriethoxysilane, vinyltrimethoxysilane, vinyltriethoxysilane, p-styryltrimethoxysilane, 3-acryloxypropyltrimethoxysilane, phenyltriethoxysilane, phenyltrimethoxysilane, hexyltrimethoxysilane, hexyltriethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, 3-mercaptopropylmethyldimethoxysilane, 3-mercaptopropyltrimethoxysilane, and 3-isocyanate propyltriethoxysilane. These compounds may be used singly, or in combination of two or more thereof.

When the metal-equivalent molar concentration of the metal alkoxide (A) is defined as $[A_M]$ and the silicon-equivalent molar concentration of the organosilane compound (C) contained in the pretreatment agent is defined as $[C_M]$, the ratio $[C_M]/[A_M]$ is preferably in a range of 0.1 to 10.0, more preferably in a range of 0.2 to 5.0.

The pH of the pretreatment agent is not particularly restricted; however, it is preferably 1.0 to 12.0, more preferably 1.5 to 5.0. When the pH is in this range, in the chemical conversion treatment step performed after the pretreatment step using the pretreatment agent, a chemical conversion coating having superior corrosion resistance can be formed. It is noted here that the pH of the pretreatment agent is a value measured for the pretreatment agent at 25° C. using a pH meter. A pH modifier may be used as well to adjust the pH of the pretreatment agent in the above-described range. A pH modifier that can be used for increasing the pH is not particularly restricted; however, it is preferably, for example, an aqueous sodium hydroxide solution, an aqueous potassium hydroxide solution, or aqueous ammonia. Meanwhile, a pH modifier that can be used for lowering the pH is also not particularly restricted; however, it is preferably, for example, carbon dioxide gas, nitric acid, sulfuric acid, hydrochloric acid, lactic acid, citric acid, tartaric acid, methanesulfonic acid, ethanesulfonic acid, hydroxymethanesulfonic acid, or hydroxyethanesulfonic acid. These pH modifiers may be used singly, or in combination of two or more thereof.

When a metal material is pretreated with the pretreatment agent of the present embodiment, there are cases where a metal component may be mixed into the pretreatment agent due to dissolution of the metal material. Accordingly, the pretreatment agent may contain a component including a metal element such as Fe, Zn, Al, or Mg (e.g., a metal salt). Further, in the same manner, the pretreatment agent may also contain a component that is unavoidably incorporated therein during operation, such as phosphorus (P). These components may be unavoidably mixed into the pretreatment agent, or may be intentionally incorporated into the pretreatment agent.

2. Method of Producing Pretreatment Agent

A method of producing the pretreatment agent is not particularly restricted and, for example, the pretreatment agent can be produced by appropriately mixing the metal alkoxide (A), the sulfonic acid component (B) and, as required, the organosilane compound (C), and subsequently adding the resulting mixture to a liquid medium. The liquid medium is not particularly restricted, and it is preferably water (deionized water or distilled water); however, the liquid medium may further contain a water-miscible organic solvent, such as a lower alcohol, in an amount of less than 50% by weight.

3. Method of Performing Pretreatment of Metal Material with Pretreatment Agent

Another embodiment of the present invention relates to a pretreatment method in which the above-described pretreatment agent is contacted on/over a surface of a metal material.

The pretreatment method includes the pretreatment step of contacting the pretreatment agent of the present embodiment on/over a surface of a metal material. The pretreatment method may also include washing the metal material with water after the pretreatment step. Further, the pretreatment method may include the degreasing treatment step of performing so-called degreasing, which is removal of oil and deposits from the surface of the metal material, prior to the pretreatment step. A degreasing treatment method is not particularly restricted, and any known method can be applied. The degreasing treatment step may or may not be followed by washing with water.

Examples of a method of contacting with the pretreatment agent include known contact methods, such as an immersion treatment method, a spray treatment method, a pouring method, and a combination of these methods. It is preferred that the pretreatment agent be contacted at a prescribed temperature for a certain period. The contact temperature is, but not particularly limited to, usually 5° C. to 60° C., preferably 10° C. to 50° C. The contact time between the pretreatment agent and the metal material is, but not particularly limited to, usually 5 seconds to 600 seconds, preferably 10 seconds to 300 seconds.

Yet another embodiment of the present invention relates to a method of producing a metal material having a chemical conversion coating, the method including, after contacting the above-described pretreatment agent on/over a surface of a metal material, the chemical conversion treatment step of forming a chemical conversion coating on the surface of the metal material. This embodiment also relates to a metal material having a chemical conversion coating, which is obtained by the above-described production method. The chemical conversion treatment step is not particularly restricted as long as it is a treatment for forming a chemical conversion coating, and examples thereof include the zirconium chemical conversion treatment step, the titanium chemical conversion treatment step, the hafnium chemical conversion treatment step, the vanadium chemical conversion treatment step, the iron phosphate chemical conversion treatment step, and the zinc phosphate chemical conversion treatment step. Only one of these chemical conversion treatment steps may be performed, or two or more thereof may be sequentially performed in combination. When two or more of these steps are performed in combination, the resultant may or may not be washed with water after various post-processes, or some of the washing operations may be omitted as well. When the zinc phosphate chemical conversion treatment step is performed as the chemical conversion treatment step, the surface-adjusting treatment step, which is aimed at improving the reactivity of the zinc phosphate chemical conversion treatment, may also be performed on the metal material between the above-described pretreatment step and the zinc phosphate chemical conversion treatment step. As a surface-adjusting treatment method of this step, any known method can be employed.

In the chemical conversion treatment step, the temperature and the contact time of the chemical conversion treatment agent can be set as appropriate in accordance with, for example, the type of the chemical conversion treatment step and the concentration of the chemical conversion treatment agent.

Further, when two or more chemical conversion treatment steps are performed in combination, the iron phosphate chemical conversion step or the zinc phosphate chemical conversion step may be incorporated along with a prescribed chemical conversion treatment step of forming another chemical conversion coating on the chemical conversion coating obtained by the above-described steps. Examples of such a chemical conversion treatment step of forming another chemical conversion coating include various chemical conversion treatment steps, such as the zirconium chemical conversion treatment step, the titanium chemical conversion treatment step, the hafnium chemical conversion treatment step, and the vanadium chemical conversion treatment step. By performing a single chemical conversion treatment step or two different chemical conversion treatment steps in the above-described manner, the corrosion resistance of the resulting metal material can be further improved.

Yet another embodiment of the present invention relates to a method of producing a painted metal material, the method including a painting step of coating a surface of the above-described metal material having a chemical conversion coating. This embodiment also relates to a painted metal material including a paint film on the surface of the metal material having a chemical conversion coating, which painted metal material is obtained by the above-described production method. A coating method is not particularly restricted, and any known method, such as roll coating, electrodeposition coating (e.g., cationic electrodeposition coating), spray coating, hot spray coating, airless spray coating, electrostatic coating (e.g., electrostatic powder coating), roller coating, curtain flow coating, brush coating, bar coating or flow immersion, can be applied. After the painting step, for example, the drying step (including a baking process and a curing process) of drying a coating material on the surface of the painted metal material may be performed as well. In addition, before the painting step, the surface of the metal material having the chemical conversion coating may or may not be washed with water. Further, before the painting step, the surface of the metal material, which has been or has not been washed with water, may or may not be dried.

Examples of the above-described coating material include known coating materials, such as oil-based coating materials, cellulose-derived coating materials, phenol resin coating materials, alkyd resin coating materials, amino-alkyd resin coating materials, urea resin coating materials, unsaturated resin coating materials, vinyl resin coating materials, acrylic resin coating materials, epoxy resin coating materials, polyurethane resin coating materials, silicone resin coating materials, fluorine resin coating materials, anticorrosive paints, antifouling coating materials, powder coating materials, cationic electrodeposition coating materials, anionic electrodeposition coating materials, aqueous coating materials, and solvent coating materials. In the painting step, a single coating operation, or two or more coating operations may be performed using the same coating material or different coating materials. The drying step is a treatment for drying and curing the applied coating material(s). Examples of a drying method include air drying, vacuum drying, convective heat drying (e.g., natural convective heat drying or forced convective heat drying), radiation drying (e.g., near-infrared drying or far-infrared drying), ultraviolet dry-curing, electron beam dry-curing, vapor curing, and bake drying. These drying methods may be performed singly, or in combination of two or more thereof.

For the above-described cationic electrodeposition coating, any known method can be applied. Examples thereof include a method of immersing the metal material having the chemical conversion coating in a coating material that is a cationic electrodeposition coating material containing an amine-added epoxy resin along with a blocked polyisocyanate curing agent as a curing component. The cationic electrodeposition coating is performed by, for example, applying a voltage to the metal material having the chemical conversion coating in the cathode direction using a rectifier, with the coating material being maintained at a prescribed temperature and stirred. The metal material subjected to cationic electrodeposition coating in this manner is washed with water and then baked, whereby a paint film can be formed on the chemical conversion coating. The baking is performed in a prescribed temperature range for a certain period. Specifically, the baking is performed at 170° C. for 20 minutes. When a cationic electrodeposition coating method using a cationic electrodeposition coating material is employed, it is preferred to control the sodium ion concentration in the treatment agents used in the degreasing step, the pretreatment step, various chemical conversion treatment steps and the like to be lower than 500 ppm by mass.

As a coating method using a powder coating material, such as spray coating, electrostatic powder coating or flow immersion, any known method can be applied. Examples of the powder coating material include those which contain a polyester resin and a block isocyanate curing agent, a β-hydroxyalkylamide curing agent (see, for example, Japanese Unexamined Patent Application Publication No. 2011-88083) or triglycidyl isocyanate as a curing agent. The resultant is baked in a prescribed temperature range for a certain period. Specifically, the baking is performed in a range of 150 to 250° C. for 20 minutes.

As a coating method using a solvent coating material, such as spray coating, electrostatic coating or bar coating, any known method can be applied. Examples of the solvent coating material include those which contain a resin, such as a melamine resin, an acrylic resin, a urethane resin or a polyester resin, and an organic solvent such as a thinner. The resultant is baked in a prescribed temperature range for a certain period. Specifically, the baking is performed at 130° C. for 20 minutes.

The paint film obtained by the painting step may be of a single layer or plural layers. When the paint film has plural layers, for example, the coating materials, the coating methods using the coating materials, and the drying methods of the resulting painted metal material, which are used in forming the respective layers, may be the same or different.

The type of the metal material is not particularly restricted. Examples thereof include: iron and steel materials (e.g., cold-rolled steel sheets, hot-rolled steel sheets, mill scale materials, pickled steel sheets, high tensile steel sheets, tool steels, alloy tool steels, spheroidal graphite cast irons, and gray cast irons); plated materials, such as zinc-plated materials (e.g., electrogalvanized materials, hot-dip galvanized materials, aluminum-containing galvanized materials, electrogalvanized materials, zinc-nickel plated materials, zinc-cobalt plated materials, and zinc vapor-deposited materials), zinc alloy-plated materials (e.g., alloyed molten zinc-plated materials, Zn—Al alloy-plated materials, Zn—Al—Mg alloy-plated materials, and zinc alloy-electroplated materials), aluminum-plated materials, nickel-plated materials, tin-plated materials, chromium-plated materials, and chromium alloy-plated materials (e.g., Cr—Ni alloy-plated materials); aluminum materials and aluminum alloy materials (e.g., 1,000 series, 2,000 series, 3,000 series, 4,000 series, 5,000 series, 6,000 series, aluminum casts, aluminum alloy casts, and die-cast materials); copper materials and copper alloy materials; titanium materials and titanium alloy materials; and magnesium materials and magnesium alloy materials.

A metal material having a chemical conversion coating can be produced by the above-described method of producing a metal material having a chemical conversion coating. Examples of the chemical conversion coating include a zirconium chemical conversion coating, titanium chemical conversion coating, a hafnium chemical conversion coating, a vanadium chemical conversion coating, an iron phosphate chemical conversion coating, and a zinc phosphate chemical conversion coating. The chemical conversion coating may be of a single layer, or two or more layers. When a zirconium chemical conversion coating, a titanium chemical conversion coating, a hafnium chemical conversion coating, a vanadium chemical conversion coating, and/or a phosphate chemical conversion coating is/are formed, the mass of the formed chemical conversion coating(s) per unit area of the metal material surface is in a range of, but not limited to, preferably 5 mg/m$^2$ to 500 mg/m$^2$, more preferably 10 mg/m$^2$ to 250 mg/m$^2$, in terms of the mass of zirconium, titanium, hafnium or vanadium in the chemical conversion coating(s). When the chemical conversion coating(s) contain two or more metal elements (e.g., zirconium, titanium, hafnium, and vanadium), a total amount of the metal elements is preferably in the above-described range.

Meanwhile, when an iron phosphate chemical conversion coating is formed, the mass of the chemical conversion coating per unit area of the metal material surface is in a range of, but not limited to, preferably 0.1 g/m$^2$ to 2.0 g/m$^2$, more preferably 0.2 g/m$^2$ to 1.5 g/m$^2$, in terms of the iron phosphate-equivalent mass of phosphorus in the chemical conversion coating. When a zinc phosphate chemical conversion coating is formed, the mass of the chemical conversion coating per unit area of the metal material surface is in a range of, but not limited to, preferably 0.5 g/m$^2$ to 10 g/m$^2$, more preferably 1.0 g/m$^2$ to 7.0 g/m$^2$. When a manganese phosphate chemical conversion coating is formed, the mass of the chemical conversion coating per unit area of the metal material surface is in a range of, but not limited to, preferably 1.0 g/m$^2$ to 10 g/m$^2$, more preferably 2.0 g/m$^2$ to 8.0 g/m$^2$.

The metal content in the chemical conversion coating, such as a zirconium chemical conversion coating, a titanium chemical conversion coating, a hafnium chemical conversion coating or a vanadium chemical conversion coating, can be determined by dissolving the chemical conversion coating in concentrated nitric acid and subsequently performing ICP emission spectrometry for the resultant. Meanwhile, in the case of an iron phosphate chemical conversion coating, a zinc phosphate chemical conversion coating, a manganese phosphate chemical conversion coating or the like, only the chemical conversion coating is dissolved in chromic acid, and the metal content therein can be calculated from the difference in weight per unit area before and after the dissolution. The metal content can also be determined by a fluorescent X-ray analysis of the metal material having the chemical conversion coating.

A painted metal material can be produced by the above-described method of producing a painted metal material. A paint film formed on the resulting painted metal material may be of a single layer or plural layers. When the paint film has plural layers, the coating materials, the coating methods, the drying methods and the like that are used for the respective layers may be the same or different. Further, the thickness of the paint film is not restricted; however, it is usually 5 μm to 100 μm. For example, in the case of electrodeposition coating, the coating is generally performed such that the resulting paint film has a thickness of about 10 to 30 μm; however, the thickness may be 100 μm or greater, or 5 μm or less.

4. Chemical Conversion Treatment Agent

The chemical conversion treatment agent to be contacted with the surface of the metal material in the above-described zirconium chemical conversion treatment step is not particularly restricted as long as it is a known chemical conversion treatment agent containing zirconium, and the below-described chemical conversion treatment agent according to one embodiment of the present invention may be used. The chemical conversion treatment agent according to one embodiment of the present invention contains a zirconium alkoxide (a) and a zirconium-containing ion supply source (b), and has a pH of 1.5 to 6.5. A metal material having a chemical conversion coating may be produced by contacting the chemical conversion treatment agent according to one embodiment of the present invention on/over a surface of the metal material and thereby performing the zirconium chemical conversion treatment step. The metal material that has not been subjected to the pretreatment step may be one which has already been subjected to the above-described degreasing treatment step, or one which has been washed with water after the degreasing treatment step. By coating the chemical conversion coating formed by the chemical conversion treatment agent according to one embodiment of the present invention, an excellent corrosion resistance can be imparted to a metal material regardless of the type of the metal material.

The zirconium alkoxide (a) is a substance having a structure in which zirconium and an oxygen atom of an alkoxy group are bound with each other. The structure may have two or more metal elements in one molecule and, in such a case, the two or more metal elements are elements different from zirconium.

The hydrocarbon group of the alkoxy group is preferably a hydrocarbon group having 1 to 10 carbon atoms, more preferably a hydrocarbon group having 2 to 8 carbon atoms. The zirconium alkoxide is not particularly restricted as long as it is a substance having a structure in which zirconium and an oxygen atom of an alkoxy group are bound with each other, and examples thereof include zirconium tetrapropoxide, zirconium tetraisopropoxide, zirconium tetra-n-propoxide, zirconium tetra-n-butoxide, zirconium butoxide, zirconium-tert-butoxide, and zirconium ethoxide. In the chemical conversion treatment agent according to one embodiment of the present invention, these components may be contained singly, or in combination of two or more thereof.

In the chemical conversion treatment agent, the zirconium alkoxide (a) may be contained as is, or exist in the form of a hydrolysate resulting from hydrolysis of the zirconium alkoxide (a), in the form of a polycondensate resulting from polycondensation of the hydrolysate, or in the form of a combination of a plurality of these forms.

The zirconium-containing ion supply source (b) is not particularly restricted as long as it is capable of supplying zirconium-containing ions when incorporated into the chemical conversion treatment agent, and examples thereof include zirconium sulfate, zirconium oxysulfate, ammonium zirconium sulfate, zirconium oxynitrate, ammonium zirconium nitrate, hexafluorozirconic acid, and hexafluorozirconium complex salts. These components may be contained singly, or in combination of two or more thereof. In the chemical conversion treatment agent, the zirconium-containing ions may be zirconium ions, zirconium-containing complex ions, or oxide ions of zirconium.

As for the content of the zirconium-containing ion supply source (b) in the chemical conversion treatment agent of the present embodiment, the zirconium-equivalent molar concentration in the chemical conversion treatment agent is usually 0.1 mmol/L or higher, preferably 0.3 mmol/L or higher, and an upper limit thereof is not particularly restricted; however, it is usually 100 mmol/L or lower.

The pH of the chemical conversion treatment agent of the present embodiment is usually in a range of 1.5 to 6.5, preferably in a range of 2.5 to 5.0. It is noted here that the pH value of the chemical conversion treatment agent is a pH value of the treatment agent at 40° C. measured by using a commercially available pH meter.

When the pH is to be adjusted within the above-described range, an alkaline component such as an aqueous sodium hydroxide solution, an aqueous potassium hydroxide solution, or an aqueous ammonia solution can be used for increasing the pH, and an acid component such as formic acid, methanesulfonic acid, ethanesulfonic acid, hydroxymethanesulfonic acid, or hydroxyethanesulfonic acid can be used for lowering the pH; however, the alkaline component and the acid component are not limited to the above.

The chemical conversion treatment agent of the present embodiment preferably further contains at least one fluorine-containing ion supply source (c). The fluorine-containing ion supply source (c) is not particularly restricted, and examples thereof include hydrofluoric acid, ammonium fluoride, ammonium bifluoride, potassium fluoride, potassium bifluoride, iron fluoride, sodium fluoride, sodium bifluoride, hexafluorozirconic acid, hexafluorozirconium complex salts, hexafluorotitanic acid, hexafluorotitanium complex salts, hexafluorohafnic acid, and hexafluorohafnium complex salts. These may be used singly, or in combination of two or more thereof. The fluorine content is preferably not less than four times by mole with respect to the zirconium-equivalent molar concentration of the zirconium-containing ion supply source (b). It is noted here that the zirconium-containing ion supply source (b) and the fluorine-containing ion supply source (c) may be the same or different from each other.

In the chemical conversion treatment agent of the present embodiment, a ratio $[a_M/b_M]$ of the zirconium-equivalent molar concentration $(a_M)$ of the zirconium alkoxide (a) to the zirconium-equivalent molar concentration $(b_M)$ of the zirconium-containing ion supply source (b) is preferably in a range of 0.01 to 10, more preferably in a range of 0.03 to 5, still more preferably in a range of 0.05 to 1.

The chemical conversion treatment agent according to one embodiment of the present invention preferably further contains at least one alkoxysilyl group-containing organosilane compound (d) (hereinafter, also referred to as "organosilane compound (d)"). In the chemical conversion treatment agent, the organosilane compound (d) may be contained as it is, or exist in the form of a hydrolysate resulting from hydrolysis of the organosilane compound (d), in the form of a polycondensate resulting from polycondensation of the hydrolysate, in the form of a copolymer (e.g., an alternating copolymer, a random copolymer, a block copolymer, or a graft copolymer) obtained by copolymerization of a hydrolysate resulting from hydrolysis of the zirconium alkoxide (a) and a hydrolysate resulting from hydrolysis of the organosilane compound (d), or in the form of a combination of a plurality of these forms. Examples of the organosilane compound (d) include the same ones as those exemplified above for the organosilane compound (C) and, from the standpoints of the adhesion of the resulting paint film and the corrosion resistance, it is preferred to use an organosilane compound that has an alkoxysilyl group as well as an amino group or a glycidyl group in the molecule.

In the chemical conversion treatment agent according to one embodiment of the present invention, a ratio $[d_M/a_M]$ of the silicon-equivalent molar concentration ($d_M$) of the organosilane compound (d) to the zirconium-equivalent molar concentration ($a_M$) of the zirconium alkoxide (a) is preferably in a range of 0.1 to 10.0, more preferably in a range of 0.2 to 5.0.

The chemical conversion treatment agent according to one embodiment of the present invention may further contain a supply source (e) of ions containing at least one metal element selected from aluminum, magnesium, and zinc. The metal element-containing ions may be in any form of metal ions, metal complex ions and the like. The supply source (e) is not particularly restricted, and examples thereof include aluminum nitrate, aluminum sulfate, aluminum fluoride, aluminum oxide, magnesium nitrate, magnesium sulfate, magnesium fluoride, zinc oxide, zinc nitrate, zinc sulfate, and zinc chloride. These components may be contained singly, or in combination of two or more thereof. It is noted here that the supply source (e) may be intentionally incorporated into the chemical conversion treatment agent, or may be unavoidably mixed into the chemical conversion treatment agent.

When the supply source (e) is incorporated, the concentration thereof in the chemical conversion treatment agent is preferably 50 mmol/L or lower in terms of metal-equivalent molar concentration. A lower limit of the concentration of the supply source (e) is not particularly restricted; however, it is usually 0.1 mmol/L or higher.

The chemical conversion treatment agent according to one embodiment of the present invention preferably further contains at least one supply source (f) selected from nitrate ion supply sources and sulfate ion supply sources. The content of the supply source (f) in the chemical conversion treatment agent is preferably in a range of 10 mmol/L to 2,000 mmol/L in terms of molar concentration. The nitrate ion supply sources and the sulfate ion supply sources are not particularly restricted as long as they are capable of supplying such ions when mixed into the chemical conversion treatment agent and, for example, known ion supply sources such as nitric acid, nitric acid salts, sulfuric acid, and sulfuric acid salts can be used as appropriate. Examples of the salts include metal salts and ammonium salts. It is noted here that the zirconium-containing ion supply source (b) and the supply source (f) may be the same or different from each other. Further, the supply source (e) and the supply source (f) may be the same or different from each other.

The chemical conversion treatment agent according to one embodiment of the present invention may further contain a component(s) other than the above-described (a) to (f). The other components are not particularly restricted, and examples thereof include supply sources of ions containing a metal element other than the ones contained in the above-exemplified supply sources (e), additives such as resins, and metal alkoxides containing a metal element other than zirconium.

Examples of the metal element other than the ones contained in the above-exemplified supply sources (e) include, but not limited to, iron, cobalt, nickel, manganese, trivalent chromium, tin, and tungsten.

Examples of the additive such as resins include, but not limited to, N-containing basic compounds and other resins. The N-containing basic compounds are not particularly restricted as long as they are basic compounds containing an N atom in their molecules, and examples thereof include: ammonia; hydrazine compounds; hydroxylamines; aliphatic amines, such as monobutylamine, dibutylamine, tributylamine, monoethylamine, diethylamine, triethylamine, monomethylamine, dimethylamine, trimethylamine, propylamine, isopropylamine, hexylamine, 2-ethylhexylamine, ethylenediamine, diethylenetriamine, octylamine, naphthylamine, and polyallylamine; alkanolamines, such as monoethanolamine, diethanolamine, triethanolamine, methylethanolamine, dimethylethanolamine, diethylethanolamine, monoisopropanolamine, diisopropanolamine, triisopropanolamine, and diallylamine resin; amines containing an alicyclic ring and/or an aromatic ring; and nitrites, such as ammonium nitrite and sodium nitrite. The above-described other resins are not particularly restricted, and examples thereof include: polyvinyl alcohols; PVA derivatives, such as carboxy-modified PVA, hydroxy-modified PVA, and silanol-modified PVA; polyethylene glycols; polyacrylic acids; acrylic resins; epoxy resins; phenol resins; urethane resins; polyol resins; ester resins; polyimide resins; and vinyl sulfonate resins.

Examples of the metal alkoxides containing a metal element other than zirconium include, but not limited to, titanium alkoxide, vanadium alkoxide, and aluminum alkoxide.

The chemical conversion treatment agent according to one embodiment of the present invention can be prepared by adding the zirconium alkoxide (a), the zirconium-containing ion supply source (b) and, as required, other components to an aqueous solvent as appropriate, and subsequently adding thereto a pH modifier as appropriate such that the resultant has a pH of 1.5 to 6.5.

The aqueous solvent is not particularly restricted as long as it contains not less than 50% by mass of water based on the mass of all solvents. Examples of a solvent other than water that is contained in the aqueous solvent include: alkane-based solvents, such as hexane and pentane; aromatic solvents, such as benzene and toluene; alcohol-based solvents, such as methanol, ethanol, propanol, isopropanol, 1-butanol, isobutanol, 2-methyl-2-propanol, and ethylcellosolve; ether-based solvents, such as tetrahydrofuran and dioxane; ester-based solvents, such as ethyl acetate and butoxyethyl acetate; amide-based solvents, such as dimethylformamide and N-methylpyrrolidone; sulfoxide-based solvents, such as dimethylsulfoxide; and phosphoric acid amide-based solvents, such as hexamethylphosphoric triamide. These solvents other than water may be mixed singly, or in combination of two or more thereof. Further, these solvents other than water may be added intentionally, or may be generated by hydrolysis of the zirconium alkoxide (a). From the environmental and economical standpoints, it is preferred to use only water.

5. Chemical Conversion Treatment Step Using Chemical Conversion Treatment Agent

The chemical conversion treatment step using the chemical conversion treatment agent according to one embodiment of the present invention is the step of contacting the chemical conversion treatment agent on/over a surface of a metal material. By this chemical conversion treatment step, a metal material having a chemical conversion coating can be produced. Examples of a method of contacting the chemical conversion treatment agent include, but not limited to, known contact methods such as an immersion treatment method, a spray treatment method, a pouring method, and a combination of these methods.

It is preferred that the chemical conversion treatment agent according to one embodiment of the present invention be contacted in a prescribed temperature range for a certain period. The contact temperature is preferably in a range of 20° C. to 60° C., more preferably in a range of 35° C. to 45° C. The contact time may be adjusted as appropriate in accordance with the concentration of the above-described chemical conversion treatment agent, and it is usually in a range of 30 seconds to 600 seconds, preferably in a range of 90 seconds to 180 seconds.

The mass of the chemical conversion coating formed by the chemical conversion treatment agent according to one embodiment of the present invention is in a range of, but not limited to, preferably 5 mg/m$^2$ to 500 mg/m$^2$, more preferably 10 mg/m$^2$ to 200 mg/m$^2$, in terms of zirconium-equivalent mass per unit area of the metal material surface. It is noted here that the chemical conversion coating obtained in the present embodiment is an amorphous film containing zirconium. As described above, the zirconium-equivalent mass can be determined by dissolving the chemical conversion coating in concentrated nitric acid and subsequently performing ICP emission spectrometry for the resultant.

EXAMPLES

The present invention will now be described more concretely by way of Examples and Comparative Examples. It is noted here, however, that the present invention is not restricted by the following Examples.

Example I

[Production of Painted Metal Materials]
<Metal Materials>

As metal materials, a cold-reduced mild steel sheet prescribed in JIS G3141:2011 (SPCC: thickness=0.8 mm), a hot-dip zinc-coated steel sheet prescribed in JIS G3302:2012 (SGCC: thickness=0.8 mm), an alloyed hot-dip zinc-coated steel sheet prescribed in JIS G3302:2012 (SCGA: thickness=0.8 mm), an electrolytic zinc-coated steel sheet prescribed in JIS G3313:2010 (SECC: thickness=0.8 mm), a hot-rolled mild steel sheet prescribed in JIS G3131:2011 (SPHC: thickness=1.8 mm), an aluminum alloy sheet prescribed in JIS H4000:2014 (A6061: thickness=0.8 mm) and a rolled steel for general structure prescribed in JIS G3101:2015 (SS400: thickness=2.3 mm), which were each cut into a size of 70 mm×150 mm, were used. In the below-described evaluations of painted metal materials, the surface of each metal material on which a burr was generated on the edge was evaluated. The burr generated in this process had a height of about 100 μm.

<Degreasing Treatment of Metal Materials>

The metal materials were immersed in an alkali degreasing agent [an aqueous solution obtained by mixing agents A and B of FINE CLEANER E2093 (manufactured by Nihon Parkerizing Co., Ltd.) with water at concentrations of 13 g/L and 11 g/L, respectively] at 45° C. for 2 minutes to remove oil and dirt from the surface of each metal material. Then, the surface of each metal material was washed with water.

<Preparation of Pretreatment Agents>

Pretreatment agents of Examples 1 to 71 and Comparative Examples 1 and 2 were each prepared by adding components to water at the respective prescribed molar concentrations as shown in Table 1 and subsequently adjusting the resultant to have a prescribed pH using methanesulfonic acid or an aqueous sodium hydroxide solution.

In the preparation of the pretreatment agents, the following components were used as a metal alkoxide (A), a sulfonic acid component (B) and an organosilane compound (C). In addition, the below-listed contaminant components were used.

A1: zirconium tetra-n-propoxide (ORGATIX ZA-45, manufactured by Matsumoto Fine Chemical Co., Ltd.)

A2: zirconium tetra-n-butoxide (ORGATIX ZA-65, manufactured by Matsumoto Fine Chemical Co., Ltd.)

A3: zirconium tetraisopropoxide (manufactured by Wako Pure Chemical Industries, Ltd.)

A4: titanium tetraisopropoxide (ORGATIX TA-8, manufactured by Matsumoto Fine Chemical Co., Ltd.)

A5: titanium tetra-n-butoxide (ORGATIX TA-21, manufactured by Matsumoto Fine Chemical Co., Ltd.)

A6: vanadium oxyisopropoxide (VIP, manufactured by Nichia Corporation)

A7: aluminum tri-s-butoxide (AL-3001, manufactured by Matsumoto Fine Chemical Co., Ltd.)

B1: methanesulfonic acid (methanesulfonic acid, manufactured by Tokyo Chemical Industry Co., Ltd.)

B2: ethanesulfonic acid (ethanesulfonic acid, manufactured by Tokyo Chemical Industry Co., Ltd.)

B3: hydroxymethanesulfonic acid (hydroxymethanesulfonic acid, manufactured by Tokyo Chemical Industry Co., Ltd.)

C1: N-2-(aminoethyl)-3-aminopropyltrimethoxysilane (KBM-603, manufactured by Shin-Etsu Chemical Co., Ltd.)

C2: N-2-(aminoethyl)-3-aminopropylmethyldimethoxysilane (KBM-602, manufactured by Shin-Etsu Chemical Co., Ltd.)

C3: 3-aminopropyltrimethoxysilane (KBM-903, manufactured by Shin-Etsu Chemical Co., Ltd.)

C4: 3-aminopropyltriethoxysilane (KBE-903, manufactured by Shin-Etsu Chemical Co., Ltd.)

C5: 3-glycidoxypropyltriethoxysilane (KBE-403, manufactured by Shin-Etsu Chemical Co., Ltd.)

C6: 3-glycidoxypropyltrimethoxysilane (KBM-403, manufactured by Shin-Etsu Chemical Co., Ltd.)

C7: 3-glycidoxypropylmethyldimethoxysilane (KBM-402, manufactured by Shin-Etsu Chemical Co., Ltd.)

C8: tetraethoxysilane (KBE-04, manufactured by Shin-Etsu Chemical Co., Ltd.)

C9: phenyltriethoxysilane (KBE-103, manufactured by Shin-Etsu Chemical Co., Ltd.)

Fe of contaminant component: iron nitrate enneahydrate (manufactured by Junsei Chemical Co., Ltd., reagent, Grade 1, oxidation number of iron is 3)

Al of contaminant component: aluminum nitrate enneahydrate (manufactured by Junsei Chemical Co., Ltd., reagent, Grade 1)

Zn of contaminant component: zinc nitrate hexahydrate (manufactured by Junsei Chemical Co., Ltd., reagent, Grade 1)

TABLE 1

| | Preparation of pretreatment agent | | | | | | | | |
|---|---|---|---|---|---|---|---|---|---|
| | Pretreatment agent | | | | | | | | |
| | (A) | | (B) | | | (C) | | | |
| Example No. | Added type | Added amount [mmol/L] | Added type | Added amount [mmol/L] | $[B_M]/[A_M]$ | Added type1 | Added amount [mmol/L] | Added type2 | |
| Example 1 | A1 | 0.1 | B1 | 0.2 | 2.0 | | | | |
| Example 2 | A1 | 0.1 | B1 | 0.25 | 2.5 | | | | |
| Example 3 | A1 | 0.1 | B1 | 0.3 | 3.0 | | | | |
| Example 4 | A1 | 0.1 | B1 | 1 | 10.0 | | | | |
| Example 5 | A1 | 0.1 | B2 | 0.3 | 3.0 | | | | |
| Example 6 | A1 | 0.1 | B3 | 0.3 | 3.0 | | | | |
| Example 7 | A1 | 0.005 | B1 | 0.015 | 3.0 | | | | |
| Example 8 | A1 | 0.01 | B1 | 0.03 | 3.0 | | | | |
| Example 9 | A1 | 0.05 | B1 | 0.15 | 3.0 | | | | |
| Example 10 | A1 | 2 | B1 | 6 | 3.0 | | | | |
| Example 11 | A1 | 0.1 | B1 | 0.3 | 3.0 | C8 | 0.1 | | |
| Example 12 | A2 | 0.1 | B1 | 0.3 | 3.0 | C8 | 0.1 | | |
| Example 13 | A3 | 0.1 | B1 | 0.3 | 3.0 | C8 | 0.1 | | |
| Example 14 | A4 | 0.1 | B1 | 0.3 | 3.0 | C8 | 0.1 | | |
| Example 15 | A5 | 0.1 | B1 | 0.3 | 3.0 | C8 | 0.1 | | |
| Example 16 | A6 | 0.1 | B1 | 0.3 | 3.0 | C8 | 0.1 | | |
| Example 17 | A7 | 0.1 | B1 | 0.3 | 3.0 | C8 | 0.1 | | |
| Example 18 | A1 | 0.1 | B2 | 0.3 | 3.0 | C8 | 0.1 | | |
| Example 19 | A1 | 0.1 | B3 | 0.3 | 3.0 | C8 | 0.1 | | |
| Example 20 | A1 | 0.1 | B1 | 0.2 | 2.0 | C8 | 0.1 | | |
| Example 21 | A1 | 0.1 | B1 | 0.25 | 2.5 | C8 | 0.1 | | |
| Example 22 | A1 | 0.1 | B1 | 0.4 | 4.0 | C8 | 0.1 | | |
| Example 23 | A1 | 0.1 | B1 | 0.8 | 8.0 | C8 | 0.1 | | |
| Example 24 | A1 | 0.005 | B1 | 0.015 | 3.0 | C8 | 0.005 | | |
| Example 25 | A1 | 0.01 | B1 | 0.03 | 3.0 | C8 | 0.01 | | |
| Example 26 | A1 | 0.05 | B1 | 0.15 | 3.0 | C8 | 0.05 | | |
| Example 27 | A1 | 0.5 | B1 | 1.5 | 3.0 | C8 | 0.5 | | |
| Example 28 | A1 | 2 | B1 | 6 | 3.0 | C8 | 2 | | |
| Example 29 | A1 | 4 | B1 | 12 | 3.0 | C8 | 4 | | |
| Example 30 | A1 | 0.1 | B1 | 0.3 | 3.0 | C1 | 0.1 | | |
| Example 31 | A1 | 0.1 | B1 | 0.3 | 3.0 | C2 | 0.1 | | |
| Example 32 | A1 | 0.1 | B1 | 0.3 | 3.0 | C3 | 0.1 | | |
| Example 33 | A1 | 0.1 | B1 | 0.3 | 3.0 | C4 | 0.1 | | |
| Example 34 | A1 | 0.1 | B1 | 0.3 | 3.0 | C5 | 0.1 | | |
| Example 35 | A1 | 0.1 | B1 | 0.3 | 3.0 | C6 | 0.1 | | |
| Example 36 | A1 | 0.1 | B1 | 0.3 | 3.0 | C7 | 0.1 | | |
| Example 37 | A1 | 0.1 | B1 | 0.3 | 3.0 | C9 | 0.1 | | |
| Example 38 | A1 | 0.1 | B1 | 0.3 | 3.0 | C8 | 0.01 | | |
| Example 39 | A1 | 0.1 | B1 | 0.3 | 3.0 | C8 | 0.02 | | |
| Example 40 | A1 | 0.1 | B1 | 0.3 | 3.0 | C8 | 0.25 | | |
| Example 41 | A1 | 0.1 | B1 | 0.3 | 3.0 | C8 | 0.4 | | |
| Example 42 | A1 | 0.1 | B1 | 0.3 | 3.0 | C8 | 0.5 | | |
| Example 43 | A1 | 0.1 | B1 | 0.3 | 3.0 | C8 | 0.8 | | |
| Example 44 | A1 | 0.1 | B1 | 0.3 | 3.0 | C8 | 1 | | |
| Example 45 | A1, A2 | 0.05 Each | B1 | 0.3 | 3.0 | C8 | 0.1 | | |
| Example 46 | A1, A4 | 0.05 Each | B1 | 0.3 | 3.0 | C8 | 0.1 | | |
| Example 47 | A1, A6 | 0.05 Each | B1 | 0.3 | 3.0 | C8 | 0.1 | | |
| Example 48 | A1, A7 | 0.05 Each | B1 | 0.3 | 3.0 | C8 | 0.1 | | |
| Example 49 | A1 | 0.1 | B1 | 0.3 | 3.0 | C1 | 0.05 | C3 | |
| Example 50 | A1 | 0.1 | B1 | 0.3 | 3.0 | C1 | 0.05 | C5 | |
| Example 51 | A1 | 0.1 | B1 | 0.3 | 3.0 | C1 | 0.05 | C8 | |
| Example 52 | A1 | 0.1 | B1 | 0.3 | 3.0 | C1 | 0.05 | C9 | |
| Example 53 | A1 | 0.1 | B1 | 0.3 | 3.0 | C3 | 0.05 | C5 | |
| Example 54 | A1 | 0.1 | B1 | 0.3 | 3.0 | C3 | 0.05 | C8 | |
| Example 55 | A1 | 0.1 | B1 | 0.3 | 3.0 | C3 | 0.05 | C9 | |
| Example 56 | A1 | 0.1 | B1 | 0.3 | 3.0 | C5 | 0.05 | C8 | |
| Example 57 | A1 | 0.1 | B1 | 0.3 | 3.0 | C5 | 0.05 | C9 | |
| Example 58 | A1 | 0.1 | B1 | 0.3 | 3.0 | C8 | 0.05 | C9 | |
| Example 59 | A1 | 0.1 | B1 | 0.3 | 3.0 | C1 | 0.033 | C3 | |
| Example 60 | A1 | 0.1 | B1 | 0.3 | 3.0 | C1 | 0.033 | C3 | |
| Example 61 | A1 | 0.1 | B1 | 0.3 | 3.0 | C1 | 0.033 | C3 | |
| Example 62 | A1 | 0.1 | B1 | 0.3 | 3.0 | C1 | 0.033 | C5 | |
| Example 63 | A1 | 0.1 | B1 | 0.3 | 3.0 | C1 | 0.033 | C5 | |
| Example 64 | A1 | 0.1 | B1 | 0.3 | 3.0 | C1 | 0.033 | C8 | |
| Example 65 | A1 | 0.1 | B1 | 0.3 | 3.0 | C3 | 0.033 | C5 | |
| Example 66 | A1 | 0.1 | B1 | 0.3 | 3.0 | C3 | 0.033 | C5 | |
| Example 67 | A1 | 0.1 | B1 | 0.3 | 3.0 | C3 | 0.033 | C8 | |
| Example 68 | A1 | 0.1 | B1 | 0.3 | 3.0 | C5 | 0.033 | C8 | |
| Example 69 | A1 | 0.1 | B1 | 0.3 | 3.0 | C8 | 0.1 | | |
| Example 70 | A1 | 0.1 | B1 | 0.3 | 3.0 | C8 | 0.1 | | |

TABLE 1-continued

| | Preparation of pretreatment agent | | | | | | | |
|---|---|---|---|---|---|---|---|---|
| Example 71 | A1 | 0.1 | B1 | 0.3 | 3.0 | C8 | 0.1 | |
| Comparative example 1 | A1 | 0.1 | B1 | 0.3 | 3.0 | | | |
| Comparative example 2 | A1 | 0.1 | B1 | 0.3 | 3.0 | C8 | 0.1 | |

| | Pretreatment agent | | | | | |
|---|---|---|---|---|---|---|
| | (C) | | | | Mixed components | |
| Example No. | Added amount [mmol/L] | Added type3 | Added amount [mmol/L] | $[C_M]/[A_M]$ | Added type | Added amount [mmol/L] | pH |
| Example 1 | | | | | | | 4 |
| Example 2 | | | | | | | 4 |
| Example 3 | | | | | | | 4 |
| Example 4 | | | | | | | 4 |
| Example 5 | | | | | | | 4 |
| Example 6 | | | | | | | 4 |
| Example 7 | | | | | | | 4 |
| Example 8 | | | | | | | 4 |
| Example 9 | | | | | | | 4 |
| Example 10 | | | | | | | 4 |
| Example 11 | | | | 1.0 | | | 4 |
| Example 12 | | | | 1.0 | | | 4 |
| Example 13 | | | | 1.0 | | | 4 |
| Example 14 | | | | 1.0 | | | 4 |
| Example 15 | | | | 1.0 | | | 4 |
| Example 16 | | | | 1.0 | | | 4 |
| Example 17 | | | | 1.0 | | | 4 |
| Example 18 | | | | 1.0 | | | 4 |
| Example 19 | | | | 1.0 | | | 4 |
| Example 20 | | | | 1.0 | | | 4 |
| Example 21 | | | | 1.0 | | | 4 |
| Example 22 | | | | 1.0 | | | 4 |
| Example 23 | | | | 1.0 | | | 4 |
| Example 24 | | | | 1.0 | | | 4 |
| Example 25 | | | | 1.0 | | | 4 |
| Example 26 | | | | 1.0 | | | 4 |
| Example 27 | | | | 1.0 | | | 4 |
| Example 28 | | | | 1.0 | | | 4 |
| Example 29 | | | | 1.0 | | | 4 |
| Example 30 | | | | 1.0 | | | 4 |
| Example 31 | | | | 1.0 | | | 4 |
| Example 32 | | | | 1.0 | | | 4 |
| Example 33 | | | | 1.0 | | | 4 |
| Example 34 | | | | 1.0 | | | 4 |
| Example 35 | | | | 1.0 | | | 4 |
| Example 36 | | | | 1.0 | | | 4 |
| Example 37 | | | | 1.0 | | | 4 |
| Example 38 | | | | 0.1 | | | 4 |
| Example 39 | | | | 0.2 | | | 4 |
| Example 40 | | | | 2.5 | | | 4 |
| Example 41 | | | | 4.0 | | | 4 |
| Example 42 | | | | 5.0 | | | 4 |
| Example 43 | | | | 8.0 | | | 4 |
| Example 44 | | | | 10.0 | | | 4 |
| Example 45 | | | | 1.0 | | | 4 |
| Example 46 | | | | 1.0 | | | 4 |
| Example 47 | | | | 1.0 | | | 4 |
| Example 48 | | | | 1.0 | | | 4 |
| Example 49 | 0.05 | | | 1.0 | | | 4 |
| Example 50 | 0.05 | | | 1.0 | | | 4 |
| Example 51 | 0.05 | | | 1.0 | | | 4 |
| Example 52 | 0.05 | | | 1.0 | | | 4 |
| Example 53 | 0.05 | | | 1.0 | | | 4 |
| Example 54 | 0.05 | | | 1.0 | | | 4 |
| Example 55 | 0.05 | | | 1.0 | | | 4 |
| Example 56 | 0.05 | | | 1.0 | | | 4 |
| Example 57 | 0.05 | | | 1.0 | | | 4 |
| Example 58 | 0.05 | | | 1.0 | | | 4 |
| Example 59 | 0.033 | C5 | 0.033 | 1.0 | | | 4 |
| Example 60 | 0.033 | C8 | 0.033 | 1.0 | | | 4 |
| Example 61 | 0.033 | C9 | 0.033 | 1.0 | | | 4 |
| Example 62 | 0.033 | C8 | 0.033 | 1.0 | | | 4 |
| Example 63 | 0.033 | C9 | 0.033 | 1.0 | | | 4 |
| Example 64 | 0.033 | C9 | 0.033 | 1.0 | | | 4 |
| Example 65 | 0.033 | C8 | 0.033 | 1.0 | | | 4 |
| Example 66 | 0.033 | C9 | 0.033 | 1.0 | | | 4 |

TABLE 1-continued

Preparation of pretreatment agent

| | | | | | | | |
|---|---|---|---|---|---|---|---|
| Example 67 | 0.033 | C9 | 0.033 | 1.0 | | | 4 |
| Example 68 | 0.033 | C9 | 0.033 | 1.0 | | | 4 |
| Example 69 | | | | 1.0 | Fe | 2 | 4 |
| Example 70 | | | | 1.0 | Al | 2 | 4 |
| Example 71 | | | | 1.0 | Zn | 2 | 4 |
| Comparative example 1 | | | | | | | 4 |
| Comparative example 2 | | | | | | | 4 |

As shown in Tables 2-1 and 2-2, the below-described pretreatment, chemical conversion treatment, electrodeposition coating treatment and the like were performed on each of the metal materials subjected to the above-described degreasing treatment, whereby painted metal materials were produced. The details thereof are described below.

<Pretreatment of Metal Materials>

The metal materials subjected to the above-described degreasing treatment were immersed in the respective pretreatment agents shown in Table 1 (pretreatment agents of Examples 1 to 71 and Comparative Examples 1 and 2) at 25° C. for 30 seconds and thereby pretreated.

<Preparation of Chemical Conversion Treatment Agents>

As chemical conversion treatment agents, general zirconium chemical conversion treatment agent, titanium chemical conversion treatment agent, hafnium chemical conversion treatment agent, vanadium chemical conversion treatment agent, iron phosphate chemical conversion treatment agent, and zinc phosphate chemical conversion treatment agent were used.

<Zirconium Chemical Conversion Treatment: Zr>

The metal materials, which had been subjected to the pretreatment or only the degreasing treatment, were each immersed in a 50-g/L aqueous solution of a zirconium chemical conversion treatment agent (PALLUCID 1500, manufactured by Nihon Parkerizing Co., Ltd.) at 40° C. for 120 seconds to produce metal materials having a zirconium chemical conversion coating formed thereon.

<Titanium Chemical Conversion Treatment: Ti>

The SPCCs, which had been pretreated with the pretreatment agent of Example 11 or subjected to only the degreasing treatment, were each immersed in a chemical conversion treatment agent, which was prepared such that it contained hexafluorotitanic acid at a titanium-equivalent mass concentration of 0.1 g/kg, at 40° C. for 120 seconds to produce metal materials having a titanium chemical conversion coating.

<Hafnium Chemical Conversion Treatment: Hf>

The SPCCs, which had been pretreated with the pretreatment agent of Example 11 or subjected to only the degreasing treatment, were each immersed in a chemical conversion treatment agent, which was prepared such that it contained hexafluorohafnic acid at a hafnium-equivalent mass concentration of 0.1 g/kg, at 40° C. for 120 seconds to produce metal materials having a hafnium chemical conversion coating.

<Vanadium Chemical Conversion Treatment: V>

The SPCCs, which had been pretreated with the pretreatment agent of Example 11 or subjected to only the degreasing treatment, were each immersed in a chemical conversion treatment agent, which was prepared such that it contained ammonium metavanadate at a vanadium-equivalent mass concentration of 0.1 g/kg, at 40° C. for 120 seconds to produce metal materials having a vanadium chemical conversion coating.

<Iron Phosphate Chemical Conversion Treatment: P—Fe>

The SPCCs, which had been pretreated with the pretreatment agent of Example 11 or subjected to only the degreasing treatment, were each sprayed with an iron phosphate chemical conversion treatment liquid [a 50 g/L iron phosphate chemical conversion treatment liquid (PALFOS 1077, manufactured by Nihon Parkerizing Co., Ltd.)] at 50° C. for 120 seconds to produce metal materials having an iron phosphate chemical conversion coating.

<Zinc Phosphate Chemical Conversion Treatment: P—Zn>

The SPCCs, which had been pretreated with the pretreatment agent of Example 11 or subjected to only the degreasing treatment, were each immersed in a surface-adjusting treatment liquid [a 3-g/L surface-adjusting treatment liquid (PREPALENE X, manufactured by Nihon Parkerizing Co., Ltd.)] at 25° C. for 30 seconds and then in a zinc phosphate chemical conversion treatment liquid [a 50 g/L zinc phosphate chemical conversion treatment liquid (PALBOND SX35, manufactured by Nihon Parkerizing Co., Ltd.)] at 35° C. for 120 seconds to produce metal materials having a zinc phosphate chemical conversion coating.

<Electrodeposition Coating Treatment of Metal Materials Having Chemical Conversion Coating>

The metal materials having a chemical conversion coating formed by the respective chemical conversion treatment were washed with water, and 180-second constant-voltage cathodic electrolysis was subsequently performed using a cationic electrodeposition coating agent (GT-100, manufactured by Kansai Paint Co., Ltd.) with each metal material being set as a cathode, thereby allowing a paint film component to precipitate on the entire surface of each metal material. Thereafter, the metal materials were washed with pure water and then baked at 170° C. (PMT: highest temperature of each metal material during baking) for 20 minutes to produce painted metal materials No. 1 to 81 and No. 84 to No. 94, and the below-described evaluations were performed. Further, coating was also performed on the metal materials subjected to only the pretreatment in the same manner as described above to produce painted metal materials No. 82 and No. 83, followed by the below-described evaluations. It is noted here that the thickness of the resulting paint film on each painted metal material was adjusted to be 20 μm.

<Solvent Coating Treatment of Metal Materials Having Chemical Conversion Coating>

The metal materials subjected to the zirconium chemical conversion treatment were washed with water, drain-dried at 100° C. for 20 minutes, and then air-spray-coated with a solvent coating material (MF COAT 300, manufactured by Kansai Paint Co., Ltd.). Thereafter, these metal materials were baked at 80° C. (PMT) for 20 minutes to produce painted metal materials No. 95 to No. 99. It is noted here that the resulting paint film thickness was adjusted to be 60 μm.

<Powder Coating Treatment of Metal Materials Having Chemical Conversion Coating>

The metal materials subjected to the zirconium chemical conversion treatment were washed with water, drain-dried at 100° C. for 20 minutes, and then coated with a powder coating material (EVACLAD 2400, manufactured by Kansai Paint Co., Ltd.) using an electrostatic powder coating machine (manufactured by Nihon Parkerizing Co., Ltd.). Thereafter, these metal materials were baked at 160° C. (PMT) for 20 minutes to produce painted metal materials No. 100 to No. 104. It is noted here that the resulting paint film thickness was adjusted to be 60 μm.

TABLE 2-1

Preparation of painted metal materials

| | Pretreatment agent | Chemical formation types of the chemical conversion treatment agent | Treated steel type |
|---|---|---|---|
| No. 1 | Example1 | Zr | SPCC |
| No. 2 | Example2 | Zr | SPCC |
| No. 3 | Example3 | Zr | SPCC |
| No. 4 | Example4 | Zr | SPCC |
| No. 5 | Example5 | Zr | SPCC |
| No. 6 | Example6 | Zr | SPCC |
| No. 7 | Example7 | Zr | SPCC |
| No. 8 | Example8 | Zr | SPCC |
| No. 9 | Example9 | Zr | SPCC |
| No. 10 | Example 10 | Zr | SPCC |
| No. 11 | Example 11 | Zr | SPCC |
| No. 12 | Example 12 | Zr | SPCC |
| No. 13 | Example 13 | Zr | SPCC |
| No. 14 | Example 14 | Zr | SPCC |
| No. 15 | Example 15 | Zr | SPCC |
| No. 16 | Example 16 | Zr | SPCC |
| No. 17 | Example 17 | Zr | SPCC |
| No. 18 | Example 18 | Zr | SPCC |
| No. 19 | Example 19 | Zr | SPCC |
| No. 20 | Example 20 | Zr | SPCC |
| No. 21 | Example 21 | Zr | SPCC |
| No. 22 | Example 22 | Zr | SPCC |
| No. 23 | Example 23 | Zr | SPCC |
| No. 24 | Example 24 | Zr | SPCC |
| No. 25 | Example 25 | Zr | SPCC |
| No. 26 | Example 26 | Zr | SPCC |
| No. 27 | Example 27 | Zr | SPCC |
| No. 28 | Example 28 | Zr | SPCC |
| No. 29 | Example 29 | Zr | SPCC |
| No. 30 | Example 30 | Zr | SPCC |
| No. 31 | Example 31 | Zr | SPCC |
| No. 32 | Example 32 | Zr | SPCC |
| No. 33 | Example 33 | Zr | SPCC |
| No. 34 | Example 34 | Zr | SPCC |
| No. 35 | Example 35 | Zr | SPCC |
| No. 36 | Example 36 | Zr | SPCC |
| No. 37 | Example 37 | Zr | SPCC |
| No. 38 | Example 38 | Zr | SPCC |
| No. 39 | Example 39 | Zr | SPCC |
| No. 40 | Example 40 | Zr | SPCC |
| No. 41 | Example 41 | Zr | SPCC |
| No. 42 | Example 42 | Zr | SPCC |
| No. 43 | Example 43 | Zr | SPCC |
| No. 44 | Example 44 | Zr | SPCC |
| No. 45 | Example 45 | Zr | SPCC |
| No. 46 | Example 46 | Zr | SPCC |
| No. 47 | Example 47 | Zr | SPCC |
| No. 48 | Example 48 | Zr | SPCC |
| No. 49 | Example 49 | Zr | SPCC |
| No. 50 | Example 50 | Zr | SPCC |
| No. 51 | Example 51 | Zr | SPCC |
| No. 52 | Example 52 | Zr | SPCC |

TABLE 2-2

Preparation of painted metal materials

| | Pretreatment agent | Chemical formation types of the chemical conversion treatment agent | Treated steel type |
|---|---|---|---|
| No. 53 | Example 53 | Zr | SPCC |
| No. 54 | Example 54 | Zr | SPCC |
| No. 55 | Example 55 | Zr | SPCC |
| No. 56 | Example 56 | Zr | SPCC |
| No. 57 | Example 57 | Zr | SPCC |
| No. 58 | Example 58 | Zr | SPCC |
| No. 59 | Example 59 | Zr | SPCC |
| No. 60 | Example 60 | Zr | SPCC |
| No. 61 | Example 61 | Zr | SPCC |
| No. 62 | Example 62 | Zr | SPCC |
| No. 63 | Example 63 | Zr | SPCC |
| No. 64 | Example 64 | Zr | SPCC |
| No. 65 | Example 65 | Zr | SPCC |
| No. 66 | Example 66 | Zr | SPCC |
| No. 67 | Example 67 | Zr | SPCC |
| No. 68 | Example 68 | Zr | SPCC |
| No. 69 | Example 11 | Ti | SPCC |
| No. 70 | Example 11 | Hf | SPCC |
| No. 71 | Example 11 | V | SPCC |
| No. 72 | Example 11 | P—Fe | SPCC |
| No. 73 | Example 11 | P—Zn | SPCC |
| No. 74 | Example 11 | Zr | SGCC |
| No. 75 | Example 11 | Zr | SCGA |
| No. 76 | Example 11 | Zr | SECC |
| No. 77 | Example 11 | Zr | SPHC |
| No. 78 | Example 11 | Zr | A6061 |
| No. 79 | Example 69 | Zr | SPCC |
| No. 80 | Example 70 | Zr | SPCC |
| No. 81 | Example 71 | Zr | SPCC |
| No. 82 | Comparative example 1 | absent | SPCC |
| No. 83 | Comparative example 2 | absent | SPCC |
| No. 84 | — | Zr | SPCC |
| No. 85 | — | Ti | SPCC |
| No. 86 | — | Hf | SPCC |
| No. 87 | — | V | SPCC |
| No. 88 | — | P—Fe | SPCC |
| No. 89 | — | P—Zn | SPCC |
| No. 90 | — | Zr | SGCC |
| No. 91 | — | Zr | SCGA |
| No. 92 | — | Zr | SECC |
| No. 93 | — | Zr | SPHC |
| No. 94 | — | Zr | A6061 |
| No. 95 | — | Zr | SPCC |
| No. 96 | Example 3 | Zr | SPCC |
| No. 97 | Example 11 | Zr | SPCC |
| No. 98 | Example 59 | Zr | SPCC |
| No. 99 | Example 69 | Zr | SPCC |
| No. 100 | — | Zr | SPCC |
| No. 101 | Example 3 | Zr | SPCC |
| No. 102 | Example 11 | Zr | SPCC |
| No. 103 | Example 59 | Zr | SPCC |
| No. 104 | Example 69 | Zr | SPCC |

[Evaluation of Painted Metal Materials]

<Corrosion Resistance>

In order to verify the corrosion resistance of the above-produced painted metal materials No. 1 to No. 104 at their edge burrs, the painted metal materials were each set in a composite cycle tester, and a 100-cycle composite cycle test was conducted in accordance with JASO-M609-91. After the 100 cycles, the maximum blister width from a burr generated at the time of cutting was measured, and the corrosion resistance of edge burr was evaluated based on the following evaluation criteria. It is noted here that, for the evaluation of edge burr, the edges and the back side of each painted metal material were not tape-sealed. The results are shown in Tables 3-1 and 3-2.

(Evaluation Criteria for Cases where Electrodeposition Coating Treatment was Performed)
S: The maximum blister width was less than 1.5 mm (most excellent).
A: The maximum blister width was 1.5 mm or greater but less than 2.5 mm.
B: The maximum blister width was 2.5 mm or greater but less than 5.0 mm.
C: The maximum blister width was 5.0 mm or greater.

(Evaluation Criteria for Cases where Solvent Coating Treatment or Powder Coating Treatment was Performed)
S: The maximum blister width was less than 2.0 mm (most excellent).
A: The maximum blister width was 2.0 mm or greater but less than 4.0 mm.
B: The maximum blister width was 4.0 mm or greater but less than 8.0 mm.
C: The maximum blister width was 8.0 mm or greater.

<Coating Adhesion>

In order to verify the coating adhesion of the painted metal materials No. 1 to No. 104, the painted metal materials were immersed in boiling water for 1 hour, and cuts were subsequently made on each painted metal material in a grid form at 1-mm intervals (10×10=100 cuts). Thereafter, water on the surface was wiped off and a cellophane tape was pasted to the grid-form cuts, after which the cellophane tape was peeled off, and the number of 1 mm-square grids where the paint film was not detached from the painted metal material was measured to evaluate the coating adhesion based on the following evaluation criteria. The results thereof are shown in Tables 3-1 and 3-2. It is noted here that "chipping" refers to a 1 mm-square paint film that was not completely detached but was partially detached. For the evaluation criteria B and C, there was no detachment with chipping.

(Evaluation Criteria)
S: The number of grids where the paint film was not detached was 100 (without chipping) (most excellent).
A: The number of grids where the paint film was not detached was 100 (with chipping).
B: The number of grids where the paint film was not detached was 90 to 99 (without chipping).
C: The number of grids where the paint film was not detached was less than 90 (without chipping).

<Throwing Power of Electrodeposition Coating>

In place of the electrodeposition coating treatment performed on the painted metal materials No. 1 to No. 73 and No. 79 to No. 89, the following electrodeposition coating throwing power test was conducted to form a paint film, and the throwing power of electrodeposition coating was evaluated for the thus obtained painted metal materials.

Using four sheets of each kind of metal material having a chemical conversion coating, an electrodeposition coating throwing power test was conducted in accordance with a method of testing the throwing power of electrodeposition coating using a four-sheet box (see, for example, the paragraphs [0085] to [0090] of Japanese Unexamined Patent Application Publication No. 2010-90409). In this test, a 70 mm×150 mm×0.5 mm stainless-steel sheet (SUS304) sealed with an insulating tape on one side (the surface opposite to the surface facing the four-sheet box) was used as a counter electrode. The liquid surface of an electrodeposition coating material was adjusted to a position of the four-sheet box at which the evaluation surfaces of the metal materials having a chemical conversion coating and the electrified surface of the counter electrode were immersed. The electrodeposition coating material, with its temperature being maintained at 30° C., was stirred using a stirrer.

In this state, by a cathodic electrolysis method using the counter electrode as an anode, a paint film was electrodeposited on the surfaces of the metal materials having a chemical conversion coating in the four-sheet box. As for specific electrolysis conditions, cathodic electrolysis was performed at a prescribed voltage for 180 seconds using a rectifier. The voltage was adjusted such that the metal material having a chemical conversion coating, which was arranged the closest to the counter electrode of the four-sheet box, would have a paint film thickness of 15 μm on the surface facing the counter electrode. Subsequently, the painted metal materials were each washed with water and baked for 20 minutes under a condition having a PMT of 170° C. to form a paint film thereon, whereby painted metal materials were produced.

Then, for the metal material having a chemical conversion coating which was arranged the farthest from the counter electrode, the thickness of the paint film formed on the surface of the counter electrode side was measured using an electromagnetic film thickness meter. The thickness of the paint film was determined by measuring the film thickness at 10 randomly selected spots on the painted metal material and calculating the average of the measured values.

Thereafter, the throwing power of the electrodeposition coating material was calculated as a percentage of the ratio ($T_2/T_1$) of the thickness ($T_1$) of the paint film formed on the counter electrode side of the metal material having a chemical conversion coating, which metal material was arranged the closest to the counter electrode, to the thickness ($T_2$) of the paint film formed on the counter electrode side of the metal material having a chemical conversion coating, which metal material was arranged the farthest to the counter electrode.

The throwing power of the electrodeposition coating was evaluated in terms of the thus calculated percentage based on the following evaluation criteria. The results thereof are shown in Tables 3-1 and 3-2.

(Evaluation Criteria)
A: The electrodeposition throwing power was 65% or higher (most excellent).
B: The electrodeposition throwing power was 50% or higher but lower than 65%.
C: The electrodeposition throwing power was lower than 50%.

It is noted here that, in all the above-described evaluations, the evaluation criteria of B or higher were regarded as a practical range.

TABLE 3-1

| | Evaluation of painted metal materials | | |
|---|---|---|---|
| | Evaluation | | |
| Film coated metal materials No. | Corrosion resistance of edge burr | Coating adhesion | Throwing Power of Electrodeposition Coating |
| No. 1 | A | A | B |
| No. 2 | A | A | B |
| No. 3 | A | A | B |
| No. 4 | A | A | B |
| No. 5 | A | A | B |
| No. 6 | A | A | B |
| No. 7 | B | B | B |
| No. 8 | B | A | B |

TABLE 3-1-continued

Evaluation of painted metal materials

| Film coated metal materials No. | Corrosion resistance of edge burr | Coating adhesion | Throwing Power of Electro- deposition Coating |
|---|---|---|---|
| No. 9 | A | A | B |
| No. 10 | A | A | B |
| No. 11 | S | S | A |
| No. 12 | S | S | A |
| No. 13 | S | S | A |
| No. 14 | S | S | A |
| No. 15 | S | S | A |
| No. 16 | S | S | A |
| No. 17 | S | S | A |
| No. 18 | S | S | A |
| No. 19 | S | S | A |
| No. 20 | A | S | A |
| No. 21 | S | S | A |
| No. 22 | S | S | A |
| No. 23 | S | S | A |
| No. 24 | A | A | A |
| No. 25 | A | S | A |
| No. 26 | S | S | A |
| No. 27 | S | S | A |
| No. 28 | A | S | A |
| No. 29 | A | S | A |
| No. 30 | S | S | A |
| No. 31 | S | S | A |
| No. 32 | S | S | A |
| No. 33 | S | S | A |
| No. 34 | S | S | A |
| No. 35 | S | S | A |
| No. 36 | S | S | A |
| No. 37 | S | S | A |
| No. 38 | A | A | A |
| No. 39 | S | S | A |
| No. 40 | S | S | A |
| No. 41 | S | S | A |
| No. 42 | S | S | A |
| No. 43 | A | S | A |
| No. 44 | A | S | A |
| No. 45 | S | S | A |
| No. 46 | S | S | A |
| No. 47 | S | S | A |
| No. 48 | S | S | A |
| No. 49 | S | S | A |
| No. 50 | S | S | A |
| No. 51 | S | S | A |
| No. 52 | S | S | A |

TABLE 3-2

Evaluation of painted metal materials

| Film coated metal materials No. | Corrosion resistance of edge burr | Coating adhesion | Throwing Power of Electrodeposition Coating |
|---|---|---|---|
| No. 53 | S | S | A |
| No. 54 | S | S | A |
| No. 55 | S | S | A |
| No. 56 | S | S | A |
| No. 57 | S | S | A |
| No. 58 | S | S | A |
| No. 59 | S | S | A |
| No. 60 | S | S | A |
| No. 61 | S | S | A |
| No. 62 | S | S | A |
| No. 63 | S | S | A |
| No. 64 | S | S | A |
| No. 65 | S | S | A |
| No. 66 | S | S | A |
| No. 67 | S | S | A |
| No. 68 | S | S | A |
| No. 69 | S | S | A |
| No. 70 | S | S | A |
| No. 71 | S | S | A |
| No. 72 | A | S | A |
| No. 73 | S | S | A |
| No. 74 | S | S | — |
| No. 75 | S | S | — |
| No. 76 | S | S | — |
| No. 77 | S | S | — |
| No. 78 | S | S | — |
| No. 79 | S | S | A |
| No. 80 | S | S | A |
| No. 81 | S | S | A |
| No. 82 | C | C | C |
| No. 83 | C | C | C |
| No. 84 | C | B | C |
| No. 85 | C | B | C |
| No. 86 | C | B | C |
| No. 87 | C | B | C |
| No. 88 | C | B | B |
| No. 89 | C | C | B |
| No. 90 | C | B | — |
| No. 91 | C | B | — |
| No. 92 | C | B | — |
| No. 93 | C | B | — |
| No. 94 | C | B | — |
| No. 95 | C | S | — |
| No. 96 | B | S | — |
| No. 97 | A | S | — |
| No. 98 | A | S | — |
| No. 99 | A | S | — |
| No. 100 | C | A | — |
| No. 101 | B | S | — |
| No. 102 | A | S | — |
| No. 103 | S | S | — |
| No. 104 | A | S | — |

Example II

[Production of Painted Metal Materials]
<Preparation of Chemical Conversion Treatment Agents>

Chemical conversion treatment agents of Examples II-1 to II-82 were each prepared by adding components to water at the respective prescribed molar concentrations as shown in Tables 4-1 and 4-2 and subsequently adjusting the resultant to have a pH of 4.0 using methanesulfonic acid or an aqueous sodium hydroxide solution.

In the preparation of the chemical conversion treatment agents, the following materials were used as a zirconium alkoxide (a), a zirconium-containing ion supply source (b), an organosilane compound (d), a supply source (e) of ions containing at least one metal element selected from aluminum, magnesium and zinc, and other components (g).

a1: zirconium tetra-n-propoxide
a2: zirconium tetra-n-butoxide
a3: zirconium tetraisopropoxide
b1: hexafluorozirconic acid (hexafluorozirconic acid, manufactured by Morita Chemical Industries Co., Ltd.)
b2: zirconium hydroxide (R zirconium hydroxide, manufactured by Daiichi Kigenso Kagaku Kogyo Co., Ltd.)
d1: N-2-(aminoethyl)-3-aminopropyltrimethoxysilane d2: N-2-(aminoethyl)-3-aminopropylmethyldimethoxysilane
d3: 3-aminopropyltrimethoxysilane
d4: 3-aminopropyltriethoxysilane
d5: 3-glycidoxypropyltriethoxysilane
d6: 3-glycidoxypropyltrimethoxysilane
d7: 3-glycidoxypropylmethyldimethoxysilane
d8: tetraethoxysilane
d9: phenyltriethoxysilane
e1: aluminum nitrate enneahydrate (manufactured by Wako Pure Chemical Industries, Ltd.)
e2: magnesium nitrate hexahydrate (manufactured by Wako Pure Chemical Industries, Ltd.)
e3: zinc oxide (manufactured by Wako Pure Chemical Industries, Ltd.)
e4: aluminum sulfate (manufactured by Wako Pure Chemical Industries, Ltd.)
e5: magnesium sulfate (manufactured by Wako Pure Chemical Industries, Ltd.)
g1: SUPERFLEX E620 (manufactured by DKS Co., Ltd.)
g2: SUPERFLEX E650 (manufactured by DKS Co., Ltd.)
g3: allylamine polymer (PAA-03, manufactured by Nittobo Medical Co., Ltd.)
g4: allylamine hydrochloride-diallylamine hydrochloride copolymer (PAA-D11-HCL, manufactured by Nittobo Medical Co., Ltd.)
g5: diallylamine hydrochloride polymer (PAS-21CL, manufactured by Nittobo Medical Co., Ltd.)
g6: diallylamine hydrochloride-sulfur dioxide copolymer (PAS-92, manufactured by Nittobo Medical Co., Ltd.)
g7: methyldiallylamine hydrochloride polymer (PAS-M-1, manufactured by Nittobo Medical Co., Ltd.)
g8: titanium tetraisopropoxide (manufactured by Wako Pure Chemical Industries, Ltd.)
g9: 1-propanol (manufactured by Wako Pure Chemical Industries, Ltd.)

In Tables 4-1 and 4-2, the content of "Fluorine" indicates the molar concentration of fluorine derived from hydrofluoric acid (manufactured by Morita Chemical Industries Co., Ltd.). Further, when hexafluorozirconic acid was used as the supply source (b), the content of "Fluorine" indicates a value that also includes the molar concentration of fluorine derived from the hexafluorozirconic acid.

In these Tables, "Nitrate ion content" and "Sulfate ion content" indicate the molar concentrations of nitrate ions and sulfate ions in nitric acid (manufactured by Wako Pure Chemical Industries, Ltd.) and sulfuric acid (manufactured by Wako Pure Chemical Industries, Ltd.), respectively. Moreover, when the supply source (e) contained nitrate ions or sulfate ions, "Nitrate ion content" and "Sulfate ion content" each indicate a value including the nitrate ions or the sulfate ions.

In these tables, the content of the other component (g) is indicated in terms of mass concentration based on pure content of each component (ppm).

TABLE 4-1

| Example/Comparative example | (a) Type of component | (a) Amount of component [mmol/L] | (b) Type of component | (b) Amount of component [mmol/L] | $a_M/b_M$ [—] | Fluorine Amount of component [mmol/L] | (d) Type of component | (d) Amount of component [mmol/L] | | | |
|---|---|---|---|---|---|---|---|---|---|---|---|
| Example II-1 | a1 | 0.005 | b1 | 0.05 | 0.1 | 15 | — | — | — | — | — |
| Example II-2 | a1 | 0.01 | b1 | 0.1 | 0.1 | 16 | — | — | — | — | — |
| Example II-3 | a1 | 0.03 | b1 | 0.3 | 0.1 | 17 | — | — | — | — | — |
| Example II-4 | a1 | 0.1 | b1 | 1 | 0.1 | 21 | — | — | — | — | — |
| Example II-5 | a1 | 1 | b1 | 10 | 0.1 | 75 | — | — | — | — | — |
| Example II-6 | a1 | 0.1 | b1 | 1 | 0.1 | 6 | — | — | — | — | — |
| Example II-7 | a1 | 0.1 | b2 | 1 | 0.1 | — | — | — | — | — | — |
| Example II-8 | a1 | 0.1 | b2 | 1 | 0.1 | 6 | — | — | — | — | — |
| Example II-9 | a1 | 0.1 | b1 | 1 | 0.1 | 21 | — | — | — | — | — |
| Example II-10 | a1 | 0.1 | b1 | 1 | 0.1 | 6 | — | — | — | — | — |
| Example II-11 | a1 | 0.1 | b1 | 1 | 0.1 | 6 | — | — | — | — | — |
| Example II-12 | a1 | 0.1 | b1 | 1 | 0.1 | 21 | — | — | — | — | — |
| Example II-13 | a1 | 0.1 | b1 | 1 | 0.1 | 21 | — | — | — | — | — |
| Example II-14 | a1 | 0.1 | b1 | 1 | 0.1 | 21 | — | — | — | — | — |
| Example II-15 | a1 | 0.1 | b1 | 1 | 0.1 | 6 | — | — | — | — | — |
| Example II-16 | a1 | 0.1 | b1 | 1 | 0.1 | 6 | — | — | — | — | — |
| Example II-17 | a1 | 0.1 | b1 | 1 | 0.1 | 21 | — | — | — | — | — |
| Example II-18 | a1 | 0.1 | b1 | 1 | 0.1 | 21 | — | — | — | — | — |
| Example II-19 | a1 | 0.1 | b1 | 1 | 0.1 | 21 | — | — | — | — | — |
| Example II-20 | a1 | 0.1 | b1 | 1 | 0.1 | 6 | — | — | — | — | — |
| Example II-21 | a1 | 0.1 | b1 | 1 | 0.1 | 6 | — | — | — | — | — |
| Example II-22 | a1 | 0.1 | b1 | 1 | 0.1 | 6 | d1 | 0.1 | — | — | — |
| Example II-23 | a1 | 0.1 | b1 | 1 | 0.1 | 6 | d2 | 0.1 | — | — | — |
| Example II-24 | a1 | 0.1 | b1 | 1 | 0.1 | 6 | d3 | 0.1 | — | — | — |
| Example II-25 | a1 | 0.1 | b1 | 1 | 0.1 | 6 | d4 | 0.1 | — | — | — |
| Example II-26 | a1 | 0.1 | b1 | 1 | 0.1 | 6 | d5 | 0.1 | — | — | — |
| Example II-27 | a1 | 0.1 | b1 | 1 | 0.1 | 6 | d6 | 0.1 | — | — | — |
| Example II-28 | a1 | 0.1 | b1 | 1 | 0.1 | 6 | d7 | 0.1 | — | — | — |
| Example II-29 | a1 | 0.1 | b1 | 1 | 0.1 | 6 | d8 | 0.1 | — | — | — |
| Example II-30 | a1 | 0.1 | b1 | 1 | 0.1 | 6 | d9 | 0.1 | — | — | — |
| Example II-31 | a1 | 0.1 | b1 | 1 | 0.1 | 6 | d1 | 0.1 | d5 | 0.1 | — |
| Example II-32 | a1 | 0.1 | b1 | 1 | 0.1 | 6 | d1 | 0.1 | d6 | 0.1 | — |
| Example II-33 | a1 | 0.1 | b1 | 1 | 0.1 | 6 | d1 | 0.1 | d7 | 0.1 | — |
| Example II-34 | a1 | 0.1 | b1 | 1 | 0.1 | 6 | d1 | 0.1 | d8 | 0.1 | — |
| Example II-35 | a1 | 0.1 | b1 | 1 | 0.1 | 6 | d1 | 0.1 | d9 | 0.1 | — |
| Example II-36 | a1 | 0.1 | b1 | 1 | 0.1 | 6 | d3 | 0.1 | d5 | 0.1 | — |
| Example II-37 | a1 | 0.1 | b1 | 1 | 0.1 | 6 | d3 | 0.1 | d6 | 0.1 | — |
| Example II-38 | a1 | 0.1 | b1 | 1 | 0.1 | 6 | d3 | 0.1 | d7 | 0.1 | — |

TABLE 4-1-continued

| Example | | (a) | | (b) | | $a_M/b_M$ | Fluorine | (d) | | | | | |
|---|---|---|---|---|---|---|---|---|---|---|---|---|---|
| Example II-39 | a1 | 0.1 | b1 | 1 | 0.1 | 6 | d3 | 0.1 | d8 | 0.1 | — | — | |
| Example II-4-0 | a1 | 0.1 | b1 | 1 | 0.1 | 6 | d3 | 0.1 | d9 | 0.1 | — | — | |
| Example II-4-1 | a1 | 0.1 | b1 | 1 | 0.1 | 6 | d1 | 0.1 | d5 | 0.1 | d8 | 0.1 | |
| Example II-4-2 | a1 | 0.1 | b1 | 1 | 0.1 | 6 | d1 | 0.1 | d5 | 0.1 | d9 | 0.1 | |
| Example II-4-3 | a1 | 0.1 | b1 | 1 | 0.1 | 6 | d3 | 0.1 | d5 | 0.1 | d8 | 0.1 | |
| Example II-4-4 | a1 | 0.1 | b1 | 1 | 0.1 | 6 | d3 | 0.1 | d5 | 0.1 | d9 | 0.1 | |
| Example II-4-5 | a1 | 0.1 | b1 | 1 | 0.1 | 6 | d1 | 0.1 | d5 | 0.1 | d8 | 0.3 | |
| Example II-4-6 | a1 | 0.1 | b1 | 1 | 0.1 | 6 | d1 | 0.1 | d5 | 0.1 | d9 | 0.3 | |
| Example II-4-7 | a1 | 0.1 | b1 | 1 | 0.1 | 6 | d3 | 0.1 | d5 | 0.1 | d8 | 0.3 | |
| Example II-4-8 | a1 | 0.1 | b1 | 1 | 0.1 | 6 | d3 | 0.1 | d5 | 0.1 | d9 | 0.3 | |

| Example/Comparative example | (e) Type of component/Amount of component [mmol/L] | | | | | | Nitrate ion content [mmol/L] | Sulfate ion content [mmol/L] | (g) Type of component | Amount of component [ppm] |
|---|---|---|---|---|---|---|---|---|---|---|
| Example II-1 | e1 | 5 | e2 | 5 | e3 | 15 | 50 | — | — | — |
| Example II-2 | e1 | 5 | e2 | 5 | e3 | 15 | 50 | — | — | — |
| Example II-3 | e1 | 5 | e2 | 5 | e3 | 15 | 50 | — | — | — |
| Example II-4 | e1 | 5 | e2 | 5 | e3 | 15 | 50 | — | — | — |
| Example II-5 | e1 | 5 | e2 | 5 | e3 | 15 | 50 | — | — | — |
| Example II-6 | — | | — | | — | | — | — | — | — |
| Example II-7 | — | | — | | — | | — | — | — | — |
| Example II-8 | — | | — | | — | | — | — | — | — |
| Example II-9 | e1 | 5 | — | | — | | 50 | — | — | — |
| Example II-10 | — | | e2 | 5 | — | | 50 | — | — | — |
| Example II-11 | — | | — | | e3 | 15 | 50 | — | — | — |
| Example II-12 | e1 | 5 | — | | e3 | 15 | 50 | — | — | — |
| Example II-13 | e1 | 5 | e2 | 5 | — | | 50 | — | — | — |
| Example II-14 | e4 | 5 | — | | — | | — | 50 | — | — |
| Example II-15 | — | | e5 | 5 | — | | — | 50 | — | — |
| Example II-16 | — | | — | | e3 | 15 | — | 50 | — | — |
| Example II-17 | e4 | 5 | — | | e3 | 15 | — | 50 | — | — |
| Example II-18 | e4 | 5 | e5 | 5 | — | | — | 50 | — | — |
| Example II-19 | e4 | 5 | e5 | 5 | e3 | 15 | — | 50 | — | — |
| Example II-20 | — | | — | | — | | 50 | — | — | — |
| Example II-21 | — | | — | | — | | — | 50 | — | — |
| Example II-22 | — | | — | | — | | 50 | — | — | — |
| Example II-23 | — | | — | | — | | 50 | — | — | — |
| Example II-24 | — | | — | | — | | 50 | — | — | — |
| Example II-25 | — | | — | | — | | 50 | — | — | — |
| Example II-26 | — | | — | | — | | 50 | — | — | — |
| Example II-27 | — | | — | | — | | 50 | — | — | — |
| Example II-28 | — | | — | | — | | 50 | — | — | — |
| Example II-29 | — | | — | | — | | 50 | — | — | — |
| Example II-30 | — | | — | | — | | 50 | — | — | — |
| Example II-31 | — | | — | | — | | 50 | — | — | — |
| Example II-32 | — | | — | | — | | 50 | — | — | — |
| Example II-33 | — | | — | | — | | 50 | — | — | — |
| Example II-34 | — | | — | | — | | 50 | — | — | — |
| Example II-35 | — | | — | | — | | 50 | — | — | — |
| Example II-36 | — | | — | | — | | 50 | — | — | — |
| Example II-37 | — | | — | | — | | 50 | — | — | — |
| Example II-38 | — | | — | | — | | 50 | — | — | — |
| Example II-39 | — | | — | | — | | 50 | — | — | — |
| Example II-4-0 | — | | — | | — | | 50 | — | — | — |
| Example II-4-1 | — | | — | | — | | 50 | — | — | — |
| Example II-4-2 | — | | — | | — | | 50 | — | — | — |
| Example II-4-3 | — | | — | | — | | 50 | — | — | — |
| Example II-4-4 | — | | — | | — | | 50 | — | — | — |
| Example II-4-5 | — | | — | | — | | 50 | — | — | — |
| Example II-4-6 | — | | — | | — | | 50 | — | — | — |
| Example II-4-7 | — | | — | | — | | 50 | — | — | — |
| Example II-4-8 | — | | — | | — | | 50 | — | — | — |

TABLE 4-2

| Example/Comparative example | (a) Type of component | Amount of component [mmol/L] | (b) Type of component | Amount of component [mmol/L] | $a_M/b_M$ [—] | Fluorine Amount of component [mmol/L] | (d) Type of component/Amount of component [mmol/L] | | | |
|---|---|---|---|---|---|---|---|---|---|---|
| Example II-49 | a1 | 0.1 | b1 | 1 | 0.1 | 6 | d3 | 0.0067 | d5 | 0.0067 |
| Example II-50 | a1 | 0.1 | b1 | 1 | 0.1 | 6 | d3 | 0.0033 | d5 | 0.0033 |
| Example II-51 | a1 | 0.1 | b1 | 1 | 0.1 | 6 | d3 | 0.0017 | d5 | 0.0017 |

TABLE 4-2-continued

| Example II-52 | a1 | 0.1 | b1 | 1 | 0.1 | 6 | d3 | 0.3333 | d5 | 0.3333 |
|---|---|---|---|---|---|---|---|---|---|---|
| Example II-53 | a1 | 0.1 | b1 | 1 | 0.1 | 6 | d3 | 0.6667 | d5 | 0.6667 |
| Example II-54 | a1 | 0.1 | b1 | 1 | 0.1 | 6 | d1 | 0.1 | d5 | 0.2 |
| Example II-55 | a1 | 0.1 | b1 | 1 | 0.1 | 6 | d1 | 0.2 | d5 | 0.1 |
| Example II-56 | a1 | 0.1 | b1 | 1 | 0.1 | 21 | d1 | 0.1 | d5 | 0.1 |
| Example II-57 | a1 | 0.1 | b1 | 1 | 0.1 | 6 | d1 | 0.1 | d5 | 0.1 |
| Example II-58 | a1 | 0.1 | b1 | 1 | 0.1 | 6 | d1 | 0.1 | d5 | 0.1 |
| Example II-59 | a1 | 0.1 | b1 | 1 | 0.1 | 21 | d1 | 0.1 | d5 | 0.1 |
| Example II-60 | a1 | 0.1 | b1 | 1 | 0.1 | 21 | d1 | 0.1 | d5 | 0.1 |
| Example II-61 | a1 | 0.1 | b1 | 1 | 0.1 | 21 | d1 | 0.1 | d5 | 0.1 |
| Example II-62 | a1 | 0.01 | b1 | 1 | 0.01 | 21 | — | — | — | — |
| Example II-63 | a1 | 0.03 | b1 | 1 | 0.03 | 21 | — | — | — | — |
| Example II-64 | a1 | 0.05 | b1 | 1 | 0.05 | 21 | — | — | — | — |
| Example II-65 | a1 | 1 | b1 | 1 | 1 | 21 | — | — | — | — |
| Example II-66 | a1 | 5 | b1 | 1 | 5 | 21 | — | — | — | — |
| Example II-67 | a1 | 10 | b1 | 1 | 10 | 21 | — | — | — | — |
| Example II-68 | a1 | 20 | b1 | 1 | 20 | 21 | — | — | — | — |
| Example II-69 | a1 | 0.1 | b1 | 1 | 0.1 | 9 | — | — | — | — |
| Example II-70 | a1 | 0.1 | b1 | 1 | 0.1 | 12 | — | — | — | — |
| Example II-71 | a1 | 0.1 | b1 | 1 | 0.1 | 51 | — | — | — | — |
| Example II-72 | a1 | 0.1 | b1 | 1 | 0.1 | 21 | d1 | 0.1 | d5 | 0.1 |
| Example II-73 | a1 | 0.1 | b1 | 1 | 0.1 | 21 | d1 | 0.1 | d5 | 0.1 |
| Example II-74 | a1 | 0.1 | b1 | 1 | 0.1 | 21 | d1 | 0.1 | d5 | 0.1 |
| Example II-75 | a1 | 0.1 | b1 | 1 | 0.1 | 21 | d1 | 0.1 | d5 | 0.1 |
| Example II-76 | a1 | 0.1 | b1 | 1 | 0.1 | 21 | d1 | 0.1 | d5 | 0.1 |
| Example II-77 | a1 | 0.1 | b1 | 1 | 0.1 | 21 | d1 | 0.1 | d5 | 0.1 |
| Example II-78 | a1 | 0.1 | b1 | 1 | 0.1 | 21 | d1 | 0.1 | d5 | 0.1 |
| Example II-79 | a1 | 0.1 | b1 | 1 | 0.1 | 21 | d1 | 0.1 | d5 | 0.1 |
| Example II-80 | a1 | 0.1 | b1 | 1 | 0.1 | 21 | d1 | 0.1 | d5 | 0.1 |
| Example II-81 | a2 | 0.1 | b1 | 1 | 0.1 | 21 | d1 | 0.1 | d5 | 0.1 |
| Example II-82 | a3 | 0.1 | b1 | 1 | 0.1 | 21 | d1 | 0.1 | d5 | 0.1 |

| Example/ Comparative example | (d) Type of component/ Amount of component [mmol/L] | | (e) Type of component/ Amount of component [mmol/L] | | | | Nitrate ion content [mmol/L] | Sulfate ion content [mmol/L] | (g) Type of component | Amount of component [ppm] |
|---|---|---|---|---|---|---|---|---|---|---|
| Example II-49 | d8 | 0.0067 | — | — | — | — | — | 50 | — | — | — |
| Example II-50 | d8 | 0.0033 | — | — | — | — | — | 50 | — | — | — |
| Example II-51 | d8 | 0.0017 | — | — | — | — | — | 50 | — | — | — |
| Example II-52 | d8 | 0.3333 | — | — | — | — | — | 50 | — | — | — |
| Example II-53 | d8 | 0.6667 | — | — | — | — | — | 50 | — | — | — |
| Example II-54 | d9 | 0.1 | — | — | — | — | — | 50 | — | — | — |
| Example II-55 | d9 | 0.1 | — | — | — | — | — | 50 | — | — | — |
| Example II-56 | d9 | 0.1 | e1 | 5 | — | — | — | 50 | — | — | — |
| Example II-57 | d9 | 0.1 | — | — | e2 | 5 | — | 50 | — | — | — |
| Example II-58 | d9 | 0.1 | — | — | — | e3 | 15 | 50 | — | — | — |
| Example II-59 | d9 | 0.1 | e1 | 5 | — | e3 | 15 | 50 | — | — | — |
| Example II-60 | d9 | 0.1 | e1 | 5 | e2 | 5 | — | 50 | — | — | — |
| Example II-61 | d9 | 0.1 | e1 | 5 | e2 | 5 | e3 | 15 | 50 | — | — | — |
| Example II-62 | — | — | e1 | 5 | e2 | 5 | e3 | 15 | 50 | — | — | — |
| Example II-63 | — | — | e1 | 5 | e2 | 5 | e3 | 15 | 50 | — | — | — |
| Example II-64 | — | — | e1 | 5 | e2 | 5 | e3 | 15 | 50 | — | — | — |
| Example II-65 | — | — | e1 | 5 | e2 | 5 | e3 | 15 | 50 | — | — | — |
| Example II-66 | — | — | e1 | 5 | e2 | 5 | e3 | 15 | 50 | — | — | — |
| Example II-67 | — | — | e1 | 5 | e2 | 5 | e3 | 15 | 50 | — | — | — |
| Example II-68 | — | — | e1 | 5 | e2 | 5 | e3 | 15 | 50 | — | — | — |
| Example II-69 | — | — | e1 | 1 | — | — | — | 50 | — | — | — |
| Example II-70 | — | — | e1 | 2 | — | — | — | 50 | — | — | — |
| Example II-71 | — | — | e1 | 15 | — | — | — | 50 | — | — | — |
| Example II-72 | d9 | 0.1 | e1 | 5 | — | e3 | 15 | 50 | — | G1 | 500 |
| Example II-73 | d9 | 0.1 | e1 | 5 | — | e3 | 15 | 50 | — | G2 | 500 |
| Example II-74 | d9 | 0.1 | e1 | 5 | — | e3 | 15 | 50 | — | G3 | 100 |
| Example II-75 | d9 | 0.1 | e1 | 5 | — | e3 | 15 | 50 | — | G4 | 100 |
| Example II-76 | d9 | 0.1 | e1 | 5 | — | e3 | 15 | 50 | — | G5 | 100 |
| Example II-77 | d9 | 0.1 | e1 | 5 | — | e3 | 15 | 50 | — | G6 | 100 |
| Example II-78 | d9 | 0.1 | e1 | 5 | — | e3 | 15 | 50 | — | G7 | 100 |
| Example II-79 | d9 | 0.1 | e1 | 5 | — | e3 | 15 | 50 | — | G8 | 100 |
| Example II-80 | d9 | 0.1 | e1 | 5 | — | e3 | 15 | 50 | — | G9 | 100 |
| Example II-81 | d9 | 0.1 | e1 | 5 | e2 | 5 | e3 | 15 | 50 | — | — | — |
| Example II-82 | d9 | 0.1 | e1 | 5 | e2 | 5 | e3 | 15 | 50 | — | — | — |

The following chemical conversion treatment and coating treatment were performed on the metal materials that had been subjected to the above-described degreasing treatment, whereby various painted metal materials were produced.

<Chemical Conversion Treatment>

The metal materials, which had been subjected to the degreasing treatment, were each immersed in one of the chemical conversion treatment agents (Example II-1 to II-82) at 40° C. for 2 minutes to perform a chemical conversion treatment. In addition, the metal materials, which had been subjected to the degreasing treatment, were each immersed in the pretreatment agent of Example 3, 11, 59 or 69 at 25° C. for 30 seconds to be pretreated, followed by a chemical conversion treatment where the pretreated metal materials were immersed in a chemical conversion treatment agent (Example II-4, II-6 or II-59) at 40° C. for 2 minutes.

<Electrodeposition Coating>

The metal materials subjected to the above chemical conversion treatment were washed with water, and an electrodeposition coating treatment was subsequently performed in the above-described manner using an electrodeposition coating agent (GT-100, manufactured by Kansai Paint Co., Ltd.) with each metal material being set as a cathode, whereby painted metal materials were produced. It is noted here that the resulting paint film thickness was adjusted to be 20 μm.

<Solvent Coating and Powder Coating>

The metal materials subjected to the above chemical conversion treatment were washed with water, drain-dried at 100° C. for 20 minutes, and then subjected to a solvent coating treatment or a powder coating treatment, whereby painted metal materials were produced. It is noted here that the resulting paint film thickness was adjusted to be 60 μm.

[Evaluation of Painted Metal Materials]

<Corrosion Resistance>

In order to verify the corrosion resistance of the above-produced painted metal materials (test pieces of No. II-1 to No. II-564), an X-shaped cut reaching the metal base was made at a size of a 10-cm square on each painted metal material, and a neutral salt spray test (NSS, JIS Z2371:2015) was conducted thereon. After 96 hours of spraying, each painted metal material was washed with water and then dried. Subsequently, a 24 mm-wide tape was pasted to the cut portion and then peeled off, and the maximum peeled width of the paint film peeled off from the cut portion was measured. For the results thereof, the corrosion resistance was evaluated based on the following evaluation criteria. It is noted here that the evaluation criteria of C or higher were regarded as a practical range.

(Evaluation Criteria)

S: The maximum peeled width was less than 1.0 mm.
A: The maximum peeled width was greater than 1.0 mm but less than 2.0 mm.
B: The maximum peeled width was greater than 2.0 mm but less than 4.0 mm.
C: The maximum peeled width was greater than 4.0 mm but less than 6.0 mm.
D: The maximum peeled width was 6.0 mm or greater.

<Adhesion Performance>

In order to verify the coating adhesion of the painted metal materials (test pieces of No. II-1 to II-564), the painted metal materials were immersed in boiling water for 1 hour, and cuts were subsequently made on each painted metal material in a grid form at 1-mm intervals (10×10=100 cuts). Thereafter, water on the surface was wiped off and a cellophane tape was pasted to the grid-form cuts, after which the cellophane tape was peeled off, and the number of grids where the paint film was not detached was measured to evaluate the adhesion based on the following evaluation criteria. It is noted here that the evaluation criteria of B or higher were regarded as a practical range.

(Evaluation Criteria)

S: The number of grids where the paint film was not detached was 100.
A: The number of grids where the paint film was not detached was 90 to 99.
B: The number of grids where the paint film was not detached was 80 to 89.
C: The number of grids where the paint film was not detached was 79 or less.

The evaluation results are shown in Tables 5-1 to 5-14.

TABLE 5-1

| Film coated metal materials | Chemical conversion treatment agent | Metal material | Film coating | Corrosion resistance | Adhesion |
| --- | --- | --- | --- | --- | --- |
| NO. II-1 | Example II-1 | SPCC | Electrodeposition coating | B | A |
| No. II-2 | Example II-2 | SPCC | Electrodeposition coating | A | A |
| NO. II-3 | Example II-3 | SPCC | Electrodeposition coating | A | S |
| NO. II-4 | Example II-4 | SPCC | Electrodeposition coating | S | S |
| NO. II-5 | Example II-5 | SPCC | Electrodeposition coating | A | A |
| NO. II-6 | Example II-6 | SPCC | Electrodeposition coating | B | A |
| NO. II-7 | Example II-7 | SPCC | Electrodeposition coating | B | A |
| NO. II-8 | Example II-8 | SPCC | Electrodeposition coating | B | S |
| NO. II-9 | Example II-9 | SPCC | Electrodeposition coating | S | S |
| NO. II-10 | Example II-10 | SPCC | Electrodeposition coating | A | S |
| NO. II-11 | Example II-11 | SPCC | Electrodeposition coating | A | S |
| NO. II-12 | Example II-12 | SPCC | Electrodeposition coating | S | S |
| NO. II-13 | Example II-13 | SPCC | Electrodeposition coating | S | S |
| NO. II-14 | Example II-14 | SPCC | Electrodeposition coating | A | S |
| NO. II-15 | Example II-15 | SPCC | Electrodeposition coating | A | S |
| NO. II-16 | Example II-16 | SPCC | Electrodeposition coating | A | S |
| NO. II-17 | Example II-17 | SPCC | Electrodeposition coating | A | S |
| NO. II-18 | Example II-18 | SPCC | Electrodeposition coating | A | S |
| NO. II-19 | Example II-19 | SPCC | Electrodeposition coating | A | S |
| NO. II-20 | Example II-20 | SPCC | Electrodeposition coating | A | A |
| NO. II-21 | Example II-21 | SPCC | Electrodeposition coating | A | A |
| NO. II-22 | Example II-22 | SPCC | Electrodeposition coating | A | A |
| NO. II-23 | Example II-23 | SPCC | Electrodeposition coating | A | A |
| NO. II-24 | Example II-24 | SPCC | Electrodeposition coating | A | A |
| NO. II-25 | Example II-25 | SPCC | Electrodeposition coating | A | A |
| NO. II-26 | Example II-26 | SPCC | Electrodeposition coating | A | A |
| NO. II-27 | Example II-27 | SPCC | Electrodeposition coating | A | A |
| NO. II-28 | Example II-28 | SPCC | Electrodeposition coating | A | A |

TABLE 5-1-continued

| Film coated metal materials | Chemical conversion treatment agent | Metal material | Film coating | Corrosion resistance | Adhesion |
|---|---|---|---|---|---|
| NO. II-29 | Example II-29 | SPCC | Electrodeposition coating | B | A |
| NO. II-30 | Example II-30 | SPCC | Electrodeposition coating | A | A |
| NO. II-31 | Example II-31 | SPCC | Electrodeposition coating | A | S |
| NO. II-32 | Example II-32 | SPCC | Electrodeposition coating | A | S |
| NO. II-33 | Example II-33 | SPCC | Electrodeposition coating | A | S |
| NO. II-34 | Example II-34 | SPCC | Electrodeposition coating | A | A |
| NO. II-35 | Example II-35 | SPCC | Electrodeposition coating | A | A |
| NO. II-36 | Example II-36 | SPCC | Electrodeposition coating | A | S |
| NO. II-37 | Example II-37 | SPCC | Electrodeposition coating | A | S |
| NO. II-38 | Example II-38 | SPCC | Electrodeposition coating | A | S |
| NO. II-39 | Example II-39 | SPCC | Electrodeposition coating | A | A |
| NO. II-40 | Example II-40 | SPCC | Electrodeposition coating | A | A |
| NO. II-41 | Example II-41 | SPCC | Electrodeposition coating | A | S |
| NO. II-42 | Example II-42 | SPCC | Electrodeposition coating | A | A |
| NO. II-43 | Example II-43 | SPCC | Electrodeposition coating | A | S |
| NO. II-44 | Example II-44 | SPCC | Electrodeposition coating | A | A |
| NO. II-45 | Example II-45 | SPCC | Electrodeposition coating | A | S |
| NO. II-46 | Example II-46 | SPCC | Electrodepositan coating | A | A |
| NO. II-47 | Example II-47 | SPCC | Electrodeposition coating | A | S |
| NO. II-48 | Example II-48 | SPCC | Electrodeposition coating | A | A |

TABLE 5-2

| Film coated metal materials | Chemical conversion treatment agent | Metal material | Film coating | Corrosion resistance | Adhesion |
|---|---|---|---|---|---|
| NO. II-49 | Example II-49 | SPCC | Electrodeposition coating | A | A |
| NO. II-50 | Example II-50 | SPCC | Electrodeposition coating | A | A |
| NO. II-51 | Example II-51 | SPCC | Electrodeposition coating | A | A |
| NO. II-52 | Example II-52 | SPCC | Electrodeposition coating | A | S |
| NO. II-53 | Example II-53 | SPCC | Electrodeposition coating | A | S |
| NO. II-54 | Example II-54 | SPCC | Electrodeposition coating | A | S |
| NO. II-55 | Example II-55 | SPCC | Electrodeposition coating | A | S |
| NO. II-56 | Example II-56 | SPCC | Electrodeposition coating | A | S |
| NO. II-57 | Example II-57 | SPCC | Electrodeposition coating | S | S |
| NO. II-58 | Example II-58 | SPCC | Electrodeposition coating | A | S |
| NO. II-59 | Example II-59 | SPCC | Electrodeposition coating | S | S |
| NO. II-60 | Example II-60 | SPCC | Electrodeposition coating | S | S |
| NO. II-61 | Example II-61 | SPCC | Electrodeposition coating | S | S |
| NO. II-62 | Example II-62 | SPCC | Electrodeposition coating | A | A |
| NO. II-63 | Example II-63 | SPCC | Electrodeposition coating | A | S |
| NO. II-64 | Example II-64 | SPCC | Electrodeposition coating | S | S |
| NO. II-65 | Example II-65 | SPCC | Electrodeposition coating | S | S |
| NO. II-66 | Example II-66 | SPCC | Electrodeposition coating | S | S |
| NO. II-67 | Example II-67 | SPCC | Electrodeposition coating | S | S |
| NO. II-68 | Example II-68 | SPCC | Electrodeposition coating | S | A |
| NO. II-69 | Example II-69 | SPCC | Electrodeposition coating | B | A |
| NO. II-70 | Example II-70 | SPCC | Electrodeposition coating | B | A |
| NO. II-71 | Example II-71 | SPCC | Electrodeposition coating | B | B |
| NO. II-72 | Example II-72 | SPCC | Electrodeposition coating | S | S |
| NO. II-73 | Example II-73 | SPCC | Electrodeposition coating | S | S |
| NO. II-74 | Example II-74 | SPCC | Electrodeposition coating | S | S |
| NO. II-75 | Example II-75 | SPCC | Electrodeposition coating | S | S |
| NO. II-76 | Example II-76 | SPCC | Electrodeposition coating | S | S |
| NO. II-77 | Example II-77 | SPCC | Electrodeposition coating | S | S |
| NO. II-78 | Example II-78 | SPCC | Electrodeposition coating | S | S |
| NO. II-79 | Example II-79 | SPCC | Electrodeposition coating | S | S |
| NO. II-80 | Example II-80 | SPCC | Electrodeposition coating | S | S |
| NO. II-81 | Example II-81 | SPCC | Electrodeposition coating | S | S |
| NO. II-82 | Example II-82 | SPCC | Electrodeposition coating | S | S |

TABLE 5-3

| Film coated metal materials | Chemical conversion treatment agent | Metal material | Film coating | Corrosion resistance | Adhesion |
|---|---|---|---|---|---|
| NO. II-83 | Example II-1 | SPCC | Solvent Coating | B | B |
| No. II-84 | Example II-2 | SPCC | Solvent Coating | B | A |
| NO. II-85 | Example II-3 | SPCC | Solvent Coating | A | S |
| NO. II-86 | Example II-4 | SPCC | Solvent Coating | S | S |
| NO. II-87 | Example II-5 | SPCC | Solvent Coating | A | S |
| NO. II-88 | Example II-6 | SPCC | Solvent Coating | B | A |
| NO. II-89 | Example II-7 | SPCC | Solvent Coating | B | B |
| NO. II-90 | Example II-8 | SPCC | Solvent Coating | B | B |
| NO. II-91 | Example II-9 | SPCC | Solvent Coating | S | S |
| NO. II-92 | Example II-10 | SPCC | Solvent Coating | A | S |
| NO. II-93 | Example II-11 | SPCC | Solvent Coating | A | S |
| NO. II-94 | Example II-12 | SPCC | Solvent Coating | S | S |
| NO. II-95 | Example II-13 | SPCC | Solvent Coating | S | S |
| NO. II-96 | Example II-14 | SPCC | Solvent Coating | A | S |
| NO. II-97 | Example II-15 | SPCC | Solvent Coating | A | S |
| NO. II-98 | Example II-16 | SPCC | Solvent Coating | A | S |
| NO. II-99 | Example II-17 | SPCC | Solvent Coating | A | S |
| NO. II-100 | Example II-18 | SPCC | Solvent Coating | A | S |
| NO. II-101 | Example II-19 | SPCC | Solvent Coating | A | S |
| NO. II-102 | Example II-20 | SPCC | Solvent Coating | A | A |
| NO. II-103 | Example II-21 | SPCC | Solvent Coating | A | A |
| NO. II-104 | Example II-22 | SPCC | Solvent Coating | A | A |
| NO. II-105 | Example II-23 | SPCC | Solvent Coating | A | A |
| NO. II-106 | Example II-24 | SPCC | Solvent Coating | A | A |
| NO. II-107 | Example II-25 | SPCC | Solvent Coating | A | A |
| NO. II-108 | Example II-26 | SPCC | Solvent Coating | A | A |
| NO. II-109 | Example II-27 | SPCC | Solvent Coating | B | A |
| NO. II-110 | Example II-28 | SPCC | Solvent Coating | B | A |
| NO. II-111 | Example II-29 | SPCC | Solvent Coating | B | A |
| NO. II-112 | Example II-30 | SPCC | Solvent Coating | A | A |
| NO. II-113 | Example II-31 | SPCC | Solvent Coating | A | A |
| NO. II-114 | Example II-32 | SPCC | Solvent Coating | A | A |
| NO. II-115 | Example II-33 | SPCC | Solvent Coating | A | A |
| NO. II-116 | Example II-34 | SPCC | Solvent Coating | B | A |
| NO. II-117 | Example II-35 | SPCC | Solvent Coating | B | A |
| NO. II-118 | Example II-36 | SPCC | Solvent Coating | A | A |
| NO. II-119 | Example II-37 | SPCC | Solvent Coating | A | A |
| NO. II-120 | Example II-38 | SPCC | Solvent Coating | A | A |
| NO. II-121 | Example II-39 | SPCC | Solvent Coating | B | A |
| NO. II-122 | Example II-40 | SPCC | Solvent Coating | B | A |
| NO. II-123 | Example II-41 | SPCC | Solvent Coating | B | A |
| NO. II-124 | Example II-42 | SPCC | Solvent Coating | A | A |
| NO. II-125 | Example II-43 | SPCC | Solvent Coating | A | A |
| NO. II-126 | Example II-44 | SPCC | Solvent Coating | A | A |
| NO. II-127 | Example II-45 | SPCC | Solvent Coating | A | A |
| NO. II-128 | Example II-46 | SPCC | Solvent Coating | A | A |
| NO. II-129 | Example II-47 | SPCC | Solvent Coating | A | A |
| NO. II-130 | Example II-48 | SPCC | Solvent Coating | A | A |

TABLE 5-4

| Film coated metal materials | Chemical conversion treatment agent | Metal material | Film coating | Corrosion resistance | Adhesion |
|---|---|---|---|---|---|
| NO. II-131 | Example II-49 | SPCC | Solvent Coating | A | A |
| NO. II-132 | Example II-50 | SPCC | Solvent Coating | A | A |
| NO. II-133 | Example II-51 | SPCC | Solvent Coating | A | A |
| NO. II-134 | Example II-52 | SPCC | Solvent Coating | A | A |
| NO. II-135 | Example II-53 | SPCC | Solvent Coating | A | S |
| NO. II-136 | Example II-54 | SPCC | Solvent Coating | A | S |
| NO. II-137 | Example II-55 | SPCC | Solvent Coating | A | S |
| NO. II-138 | Example II-56 | SPCC | Solvent Coating | S | S |
| NO. II-139 | Example II-57 | SPCC | Solvent Coating | A | S |
| NO. II-140 | Example II-58 | SPCC | Solvent Coating | A | S |
| NO. II-141 | Example II-59 | SPCC | Solvent Coating | S | S |
| NO. II-142 | Example II-60 | SPCC | Solvent Coating | S | S |
| NO. II-143 | Example II-61 | SPCC | Solvent Coating | S | S |
| NO. II-144 | Example II-62 | SPCC | Solvent Coating | B | A |
| NO. II-145 | Example II-63 | SPCC | Solvent Coating | A | A |
| NO. II-146 | Example II-64 | SPCC | Solvent Coating | S | S |
| NO. II-147 | Example II-65 | SPCC | Solvent Coating | S | S |
| NO. II-148 | Example II-66 | SPCC | Solvent Coating | S | S |

TABLE 5-4-continued

| Film coated metal materials | Chemical conversion treatment agent | Metal material | Film coating | Corrosion resistance | Adhesion |
|---|---|---|---|---|---|
| NO. II-149 | Example II-67 | SPCC | Solvent Coating | S | A |
| NO. II-150 | Example II-68 | SPCC | Solvent Coating | S | A |
| NO. II-151 | Example II-69 | SPCC | Solvent Coating | B | A |
| NO. II-152 | Example II-70 | SPCC | Solvent Coating | B | A |
| NO. II-153 | Example II-71 | SPCC | Solvent Coating | B | B |
| NO. II-154 | Example II-72 | SPCC | Solvent Coating | S | S |
| NO. II-155 | Example II-73 | SPCC | Solvent Coating | S | S |
| NO. II-156 | Example II-74 | SPCC | Solvent Coating | S | S |
| NO. II-157 | Example II-75 | SPCC | Solvent Coating | S | S |
| NO. II-158 | Example II-76 | SPCC | Solvent Coating | S | S |
| NO. II-159 | Example II-77 | SPCC | Solvent Coating | S | S |
| NO. II-160 | Example II-78 | SPCC | Solvent Coating | S | S |
| NO. II-161 | Example II-79 | SPCC | Solvent Coating | S | S |
| NO. II-162 | Example II-80 | SPCC | Solvent Coating | S | S |
| NO. II-163 | Example II-81 | SPCC | Solvent Coating | S | S |
| NO. II-164 | Example II-82 | SPCC | Solvent Coating | S | S |

TABLE 5-5

| Film coated metal materials | Chemical conversion treatment agent | Metal material | Film coating | Corrosion resistance | Adhesion |
|---|---|---|---|---|---|
| NO. II-165 | Example II-1 | SPCC | Powder Coating | B | A |
| No. II-166 | Example II-2 | SPCC | Powder Coating | A | A |
| NO. II-167 | Example II-3 | SPCC | Powder Coating | A | S |
| NO. II-168 | Example II-4 | SPCC | Powder Coating | S | S |
| NO. II-169 | Example II-5 | SPCC | Powder Coating | A | S |
| NO. II-170 | Example II-6 | SPCC | Powder Coating | B | A |
| NO. II-171 | Example II-7 | SPCC | Powder Coating | B | A |
| NO. II-172 | Example II-8 | SPCC | Powder Coating | B | A |
| NO. II-173 | Example II-9 | SPCC | Powder Coating | S | S |
| NO. II-174 | Example II-10 | SPCC | Powder Coating | A | S |
| NO. II-175 | Example II-11 | SPCC | Powder Coating | A | S |
| NO. II-176 | Example II-12 | SPCC | Powder Coating | S | S |
| NO. II-177 | Example II-13 | SPCC | Powder Coating | S | S |
| NO. II-178 | Example II-14 | SPCC | Powder Coating | A | S |
| NO. II-179 | Example II-15 | SPCC | Powder Coating | A | S |
| NO. II-180 | Example II-16 | SPCC | Powder Coating | A | S |
| NO. II-181 | Example II-17 | SPCC | Powder Coating | A | S |
| NO. II-182 | Example II-18 | SPCC | Powder Coating | A | S |
| NO. II-183 | Example II-19 | SPCC | Powder Coating | A | S |
| NO. II-184 | Example II-20 | SPCC | Powder Coating | A | A |
| NO. II-185 | Example II-21 | SPCC | Powder Coating | A | A |
| NO. II-186 | Example II-22 | SPCC | Powder Coating | A | S |
| NO. II-187 | Example II-23 | SPCC | Powder Coating | A | S |
| NO. II-188 | Example II-24 | SPCC | Powder Coating | A | A |
| NO. II-189 | Example II-25 | SPCC | Powder Coating | A | A |
| NO. II-190 | Example II-26 | SPCC | Powder Coating | A | A |
| NO. II-191 | Example II-27 | SPCC | Powder Coating | A | A |
| NO. II-192 | Example II-28 | SPCC | Powder Coating | A | A |
| NO. II-193 | Example II-29 | SPCC | Powder Coating | B | A |
| NO. II-194 | Example II-30 | SPCC | Powder Coating | A | A |
| NO. II-195 | Example II-31 | SPCC | Powder Coating | A | A |
| NO. II-196 | Example II-32 | SPCC | Powder Coating | A | S |
| NO. II-197 | Example II-33 | SPCC | Powder Coating | A | A |
| NO. II-198 | Example II-34 | SPCC | Powder Coating | A | A |
| NO. II-199 | Example II-35 | SPCC | Powder Coating | A | A |
| NO. II-200 | Example II-36 | SPCC | Powder Coating | B | A |
| NO. II-201 | Example II-37 | SPCC | Powder Coating | A | A |
| NO. II-202 | Example II-38 | SPCC | Powder Coating | A | A |
| NO. II-203 | Example II-39 | SPCC | Powder Coating | A | A |
| NO. II-204 | Example II-40 | SPCC | Powder Coating | B | A |
| NO. II-205 | Example II-41 | SPCC | Powder Coating | A | A |
| NO. II-206 | Example II-42 | SPCC | Powder Coating | A | A |
| NO. II-207 | Example II-43 | SPCC | Powder Coating | A | S |
| NO. II-208 | Example II-44 | SPCC | Powder Coating | A | A |
| NO. II-209 | Example II-45 | SPCC | Powder Coating | A | A |
| NO. II-210 | Example II-46 | SPCC | Powder Coating | B | A |
| NO. II-211 | Example II-47 | SPCC | Powder Coating | A | A |
| NO. II-212 | Example II-48 | SPCC | Powder Coating | A | A |

TABLE 5-6

| Film coated metal materials | Chemical conversion treatment agent | Metal material | Film coating | Corrosion resistance | Adhesion |
|---|---|---|---|---|---|
| NO. II-213 | Example II-49 | SPCC | Powder Coating | A | A |
| NO. II-214 | Example II-50 | SPCC | Powder Coating | A | A |
| NO. II-215 | Example II-51 | SPCC | Powder Coating | A | A |
| NO. II-216 | Example II-52 | SPCC | Powder Coating | A | A |
| NO. II-217 | Example II-53 | SPCC | Powder Coating | A | S |
| NO. II-218 | Example II-54 | SPCC | Powder Coating | A | S |
| NO. II-219 | Example II-55 | SPCC | Powder Coating | A | S |
| NO. II-220 | Example II-56 | SPCC | Powder Coating | S | S |
| NO. II-221 | Example II-57 | SPCC | Powder Coating | A | S |
| NO. II-222 | Example II-58 | SPCC | Powder Coating | A | S |
| NO. II-223 | Example II-59 | SPCC | Powder Coating | S | S |
| NO. II-224 | Example II-60 | SPCC | Powder Coating | S | S |
| NO. II-225 | Example II-61 | SPCC | Powder Coating | S | S |
| NO. II-226 | Example II-62 | SPCC | Powder Coating | A | A |
| NO. II-227 | Example II-63 | SPCC | Powder Coating | A | S |
| NO. II-228 | Example II-64 | SPCC | Powder Coating | S | S |
| NO. II-229 | Example II-65 | SPCC | Powder Coating | S | S |
| NO. II-230 | Example II-66 | SPCC | Powder Coating | S | S |
| NO. II-231 | Example II-67 | SPCC | Powder Coating | S | S |
| NO. II-232 | Example II-68 | SPCC | Powder Coating | S | S |
| NO. II-233 | Example II-69 | SPCC | Powder Coating | B | A |
| NO. II-234 | Example II-70 | SPCC | Powder Coating | B | A |
| NO. II-235 | Example II-71 | SPCC | Powder Coating | B | A |
| NO. II-236 | Example II-72 | SPCC | Powder Coating | S | S |
| NO. II-237 | Example II-73 | SPCC | Powder Coating | S | S |
| NO. II-238 | Example II-74 | SPCC | Powder Coating | S | S |
| NO. II-239 | Example II-75 | SPCC | Powder Coating | S | S |
| NO. II-240 | Example II-76 | SPCC | Powder Coating | S | S |
| NO. II-241 | Example II-77 | SPCC | Powder Coating | S | S |
| NO. II-242 | Example II-78 | SPCC | Powder Coating | S | S |
| NO. II-243 | Example II-79 | SPCC | Powder Coating | S | S |
| NO. II-244 | Example II-80 | SPCC | Powder Coating | S | S |
| NO. II-245 | Example II-81 | SPCC | Powder Coating | S | S |
| NO. II-246 | Example II-82 | SPCC | Powder Coating | S | S |

TABLE 5-7

| Film coated metal materials | Chemical conversion treatment agent | Metal material | Film coating | Corrosion resistance | Adhesion |
|---|---|---|---|---|---|
| NO. II-247 | Example II-1 | SS400 | Electrodeposition coating | C | B |
| No. II-248 | Example II-2 | SS400 | Electrodeposition coating | C | A |
| NO. II-249 | Example II-3 | SS400 | Electrodeposition coating | B | A |
| NO. II-250 | Example II-4 | SS400 | Electrodeposition coating | B | A |
| NO. II-251 | Example II-5 | SS400 | Electrodeposition coating | B | A |
| NO. II-252 | Example II-6 | SS400 | Electrodeposition coating | C | B |
| NO. II-253 | Example II-7 | SS400 | Electrodeposition coating | C | B |
| NO. II-254 | Example II-8 | SS400 | Electrodeposition coating | C | B |
| NO. II-255 | Example II-9 | SS400 | Electrodeposition coating | B | A |
| NO. II-256 | Example II-10 | SS400 | Electrodeposition coating | B | A |
| NO. II-257 | Example II-11 | SS400 | Electrodeposition coating | B | A |
| NO. II-258 | Example II-12 | SS400 | Electrodeposition coating | B | A |
| NO. II-259 | Example II-13 | SS400 | Electrodeposition coating | B | A |
| NO. II-260 | Example II-14 | SS400 | Electrodeposition coating | B | A |
| NO. II-261 | Example II-15 | SS400 | Electrodeposition coating | B | A |
| NO. II-262 | Example II-16 | SS400 | Electrodeposition coating | C | A |
| NO. II-263 | Example II-17 | SS400 | Electrodeposition coating | C | A |
| NO. II-264 | Example II-18 | SS400 | Electrodeposition coating | B | A |
| NO. II-265 | Example II-19 | SS400 | Electrodeposition coating | B | A |
| NO. II-266 | Example II-20 | SS400 | Electrodeposition coating | B | A |
| NO. II-267 | Example II-21 | SS400 | Electrodeposition coating | C | A |
| NO. II-268 | Example II-22 | SS400 | Electrodeposition coating | B | A |
| NO. II-269 | Example II-23 | SS400 | Electrodeposition coating | B | B |
| NO. II-270 | Example II-24 | SS400 | Electrodeposition coating | B | B |
| NO. II-271 | Example II-25 | SS400 | Electrodeposition coating | B | B |
| NO. II-272 | Example II-26 | SS400 | Electrodeposition coating | B | B |
| NO. II-273 | Example II-27 | SS400 | Electrodeposition coating | B | B |
| NO. II-274 | Example II-28 | SS400 | Electrodeposition coating | B | B |
| NO. II-275 | Example II-29 | SS400 | Electrodeposition coating | B | B |
| NO. II-276 | Example II-30 | SS400 | Electrodeposition coating | B | B |
| NO. II-277 | Example II-31 | SS400 | Electrodeposition coating | B | B |
| NO. II-278 | Example II-32 | SS400 | Electrodeposition coating | B | A |
| NO. II-279 | Example II-33 | SS400 | Electrodeposition coating | B | B |
| NO. II-280 | Example II-34 | SS400 | Electrodeposition coating | B | B |
| NO. II-281 | Example II-35 | SS400 | Electrodeposition coating | B | B |
| NO. II-282 | Example II-36 | SS400 | Electrodeposition coating | B | B |
| NO. II-283 | Example II-37 | SS400 | Electrodeposition coating | B | B |
| NO. II-284 | Example II-38 | SS400 | Electrodeposition coating | B | B |
| NO. II-285 | Example II-39 | SS400 | Electrodeposition coating | B | B |
| NO. II-286 | Example II-40 | SS400 | Electrodeposition coating | B | B |
| NO. II-287 | Example II-41 | SS400 | Electrodeposition coating | B | B |
| NO. II-288 | Example II-42 | SS400 | Electrodeposition coating | B | B |
| NO. II-289 | Example II-43 | SS400 | Electrodeposition coating | B | A |
| NO. II-290 | Example II-44 | SS400 | Electrodeposition coating | B | B |
| NO. II-291 | Example II-45 | SS400 | Electrodeposition coating | B | B |

TABLE 5-7-continued

| Film coated metal materials | Chemical conversion treatment agent | Metal material | Film coating | Corrosion resistance | Adhesion |
|---|---|---|---|---|---|
| NO. II-292 | Example II-46 | SS400 | Electrodeposition coating | B | B |
| NO. II-293 | Example II-47 | SS400 | Electrodeposition coating | B | A |
| NO. II-294 | Example II-48 | SS400 | Electrodeposition coating | B | B |

TABLE 5-8

| Film coated metal materials | Chemical conversion treatment agent | Metal material | Film coating | Corrosion resistance | Adhesion |
|---|---|---|---|---|---|
| NO. II-295 | Example II-49 | SS400 | Electrodeposition coating | B | B |
| NO. II-296 | Example II-50 | SS400 | Electrodeposition coating | B | A |
| NO. II-297 | Example II-51 | SS400 | Electrodeposition coating | B | A |
| NO. II-298 | Example II-52 | SS400 | Electrodeposition coating | B | A |
| NO. II-299 | Example II-53 | SS400 | Electrodeposition coating | B | A |
| NO. II-300 | Example II-54 | SS400 | Electrodeposition coating | B | A |
| NO. II-301 | Example II-55 | SS400 | Electrodeposition coating | B | A |
| NO. II-302 | Example II-56 | SS400 | Electrodeposition coating | A | A |
| NO. II-303 | Example II-57 | SS400 | Electrodeposition coating | A | A |
| NO. II-304 | Example II-58 | SS400 | Electrodeposition coating | B | A |
| NO. II-305 | Example II-59 | SS400 | Electrodeposition coating | A | S |
| NO. II-306 | Example II-60 | SS400 | Electrodeposition coating | A | S |
| NO. II-307 | Example II-61 | SS400 | Electrodeposition coating | A | S |
| NO. II-308 | Example II-62 | SS400 | Electrodeposition coating | B | A |
| NO. II-309 | Example II-63 | SS400 | Electrodeposition coating | B | A |
| NO. II-310 | Example II-64 | SS400 | Electrodeposition coating | B | A |
| NO. II-311 | Example II-65 | SS400 | Electrodeposition coating | A | A |
| NO. II-312 | Example II-66 | SS400 | Electrodeposition coating | A | A |
| NO. II-313 | Example II-67 | SS400 | Electrodeposition coating | A | A |
| NO. II-314 | Example II-68 | SS400 | Electrodeposition coating | A | A |
| NO. II-315 | Example II-69 | SS400 | Electrodeposition coating | B | A |
| NO. II-316 | Example II-70 | SS400 | Electrodeposition coating | B | A |
| NO. II-317 | Example II-71 | SS400 | Electrodeposition coating | A | A |
| NO. II-318 | Example II-72 | SS400 | Electrodeposition coating | A | S |
| NO. II-319 | Example II-73 | SS400 | Electrodeposition coating | A | S |
| NO. II-320 | Example II-74 | SS400 | Electrodeposition coating | A | A |
| NO. II-321 | Example II-75 | SS400 | Electrodeposition coating | A | S |
| NO. II-322 | Example II-76 | SS400 | Electrodeposition coating | A | S |
| NO. II-323 | Example II-77 | SS400 | Electrodeposition coating | A | S |
| NO. II-324 | Example II-78 | SS400 | Electrodeposition coating | A | S |
| NO. II-325 | Example II-79 | SS400 | Electrodeposition coating | A | S |
| NO. II-326 | Example II-80 | SS400 | Electrodeposition coating | A | S |
| NO. II-327 | Example II-81 | SS400 | Electrodeposition coating | A | S |
| NO. II-328 | Example II-82 | SS400 | Electrodeposition coating | A | S |

TABLE 5-9

| Film coated metal materials | Chemical conversion treatment agent | Metal material | Coating | Corrosion resistance | Adhesion |
|---|---|---|---|---|---|
| NO. II-329 | Example II-1 | SS400 | Solvent Coating | C | B |
| No. II-330 | Example II-2 | SS400 | Solvent Coating | C | A |
| NO. II-331 | Example II-3 | SS400 | Solvent Coating | B | A |
| NO. II-332 | Example II-4 | SS400 | Solvent Coating | B | A |
| NO. II-333 | Example II-5 | SS400 | Solvent Coating | B | A |
| NO. II-334 | Example II-6 | SS400 | Solvent Coating | C | B |
| NO. II-335 | Example II-7 | SS400 | Solvent Coating | C | B |
| NO. II-336 | Example II-8 | SS400 | Solvent Coating | C | B |
| NO. II-337 | Example II-9 | SS400 | Solvent Coating | B | A |
| NO. II-338 | Example II-10 | SS400 | Solvent Coating | B | A |
| NO. II-339 | Example II-11 | SS400 | Solvent Coating | C | A |
| NO. II-340 | Example II-12 | SS400 | Solvent Coating | B | A |
| NO. II-341 | Example II-13 | SS400 | Solvent Coating | B | A |
| NO. II-342 | Example II-14 | SS400 | Solvent Coating | B | A |
| NO. II-343 | Example II-15 | SS400 | Solvent Coating | B | A |
| NO. II-344 | Example II-16 | SS400 | Solvent Coating | C | A |
| NO. II-345 | Example II-17 | SS400 | Solvent Coating | C | A |

TABLE 5-9-continued

| Film coated metal materials | Chemical conversion treatment agent | Metal material | Coating | Corrosion resistance | Adhesion |
|---|---|---|---|---|---|
| NO. II-346 | Example II-18 | SS400 | Solvent Coating | B | A |
| NO. II-347 | Example II-19 | SS400 | Solvent Coating | B | A |
| NO. II-348 | Example II-20 | SS400 | Solvent Coating | B | A |
| NO. II-349 | Example II-21 | SS400 | Solvent Coating | C | A |
| NO. II-350 | Example II-22 | SS400 | Solvent Coating | B | B |
| NO. II-351 | Example II-23 | SS400 | Solvent Coating | B | B |
| NO. II-352 | Example II-24 | SS400 | Solvent Coating | B | B |
| NO. II-353 | Example II-25 | SS400 | Solvent Coating | B | B |
| NO. II-354 | Example II-26 | SS400 | Solvent Coating | B | B |
| NO. II-355 | Example II-27 | SS400 | Solvent Coating | B | B |
| NO. II-356 | Example II-28 | SS400 | Solvent Coating | B | B |
| NO. II-357 | Example II-29 | SS400 | Solvent Coating | C | B |
| NO. II-358 | Example II-30 | SS400 | Solvent Coating | A | B |
| NO. II-359 | Example II-31 | SS400 | Solvent Coating | B | B |
| NO. II-360 | Example II-32 | SS400 | Solvent Coating | B | B |
| NO. II-361 | Example II-33 | SS400 | Solvent Coating | B | B |
| NO. II-362 | Example II-34 | SS400 | Solvent Coating | A | B |
| NO. II-363 | Example II-35 | SS400 | Solvent Coating | B | B |
| NO. II-364 | Example II-36 | SS400 | Solvent Coating | B | B |
| NO. II-365 | Example II-37 | SS400 | Solvent Coating | B | B |
| NO. II-366 | Example II-38 | SS400 | Solvent Coating | B | B |
| NO. II-367 | Example II-39 | SS400 | Solvent Coating | B | B |
| NO. II-368 | Example II-40 | SS400 | Solvent Coating | A | B |
| NO. II-369 | Example II-41 | SS400 | Solvent Coating | B | B |
| NO. II-370 | Example II-42 | SS400 | Solvent Coating | B | B |
| NO. II-371 | Example II-43 | SS400 | Solvent Coating | B | B |
| NO. II-372 | Example II-44 | SS400 | Solvent Coating | B | B |
| NO. II-373 | Example II-45 | SS400 | Solvent Coating | B | B |
| NO. II-374 | Example II-46 | SS400 | Solvent Coating | B | B |
| NO. II-375 | Example II-47 | SS400 | Solvent Coating | B | B |
| NO. II-376 | Example II-48 | SS400 | Solvent Coating | A | B |

TABLE 5-10

| Film coated metal materials | Chemical conversion treatment agent | Metal material | Film coating | Corrosion resistance | Adhesion |
|---|---|---|---|---|---|
| NO. II-377 | Example II-49 | SS400 | Solvent Coating | B | B |
| NO. II-378 | Example II-50 | SS400 | Solvent Coating | B | B |
| NO. II-379 | Example II-51 | SS400 | Solvent Coating | B | B |
| NO. II-380 | Example II-52 | SS400 | Solvent Coating | B | B |
| NO. II-381 | Example II-53 | SS400 | Solvent Coating | B | A |
| NO. II-382 | Example II-54 | SS400 | Solvent Coating | B | B |
| NO. II-383 | Example II-55 | SS400 | Solvent Coating | B | B |
| NO. II-384 | Example II-56 | SS400 | Solvent Coating | A | A |
| NO. II-385 | Example II-57 | SS400 | Solvent Coating | B | A |
| NO. II-386 | Example II-58 | SS400 | Solvent Coating | B | A |
| NO. II-387 | Example II-59 | SS400 | Solvent Coating | A | A |
| NO. II-388 | Example II-60 | SS400 | Solvent Coating | A | A |
| NO. II-389 | Example II-61 | SS400 | Solvent Coating | A | A |
| NO. II-390 | Example II-62 | SS400 | Solvent Coating | B | A |
| NO. II-391 | Example II-63 | SS400 | Solvent Coating | B | A |
| NO. II-392 | Example II-64 | SS400 | Solvent Coating | B | A |
| NO. II-393 | Example II-65 | SS400 | Solvent Coating | B | A |
| NO. II-394 | Example II-66 | SS400 | Solvent Coating | A | A |
| NO. II-395 | Example II-67 | SS400 | Solvent Coating | A | A |
| NO. II-396 | Example II-68 | SS400 | Solvent Coating | A | A |
| NO. II-397 | Example II-69 | SS400 | Solvent Coating | B | A |
| NO. II-398 | Example II-70 | SS400 | Solvent Coating | B | A |
| NO. II-399 | Example II-71 | SS400 | Solvent Coating | B | B |
| NO. II-400 | Example II-72 | SS400 | Solvent Coating | A | A |
| NO. II-401 | Example II-73 | SS400 | Solvent Coating | A | A |
| NO. II-402 | Example II-74 | SS400 | Solvent Coating | A | A |
| NO. II-403 | Example II-75 | SS400 | Solvent Coating | A | A |
| NO. II-404 | Example II-76 | SS400 | Solvent Coating | A | S |
| NO. II-405 | Example II-77 | SS400 | Solvent Coating | A | A |
| NO. II-406 | Example II-78 | SS400 | Solvent Coating | A | A |
| NO. II-407 | Example II-79 | SS400 | Solvent Coating | A | A |

TABLE 5-10-continued

| Film coated metal materials | Chemical conversion treatment agent | Metal material | Film coating | Corrosion resistance | Adhesion |
| --- | --- | --- | --- | --- | --- |
| NO. II-408 | Example II-80 | SS400 | Solvent Coating | A | A |
| NO. II-409 | Example II-81 | SS400 | Solvent Coating | A | A |
| NO. II-410 | Example II-82 | SS400 | Solvent Coating | A | A |

TABLE 5-11

| Film coated metal materials | Chemical conversion treatment agent | Metal material | Film coating | Corrosion resistance | Adhesion |
| --- | --- | --- | --- | --- | --- |
| NO. II-411 | Example II-1 | SS400 | Powder Coating | C | B |
| No. II-412 | Example II-2 | SS400 | Powder Coating | B | B |
| NO. II-413 | Example II-3 | SS400 | Powder Coating | B | A |
| NO. II-414 | Example II-4 | SS400 | Powder Coating | B | A |
| NO. II-415 | Example II-5 | SS400 | Powder Coating | A | A |
| NO. II-416 | Example II-6 | SS400 | Powder Coating | B | A |
| NO. II-417 | Example II-7 | SS400 | Powder Coating | B | B |
| NO. II-418 | Example II-8 | SS400 | Powder Coating | B | B |
| NO. II-419 | Example II-9 | SS400 | Powder Coating | B | A |
| NO. II-420 | Example II-10 | SS400 | Powder Coating | B | A |
| NO. II-421 | Example II-11 | SS400 | Powder Coating | B | B |
| NO. II-422 | Example II-12 | SS400 | Powder Coating | B | A |
| NO. II-423 | Example II-13 | SS400 | Powder Coating | B | A |
| NO. II-424 | Example II-14 | SS400 | Powder Coating | B | A |
| NO. II-425 | Example II-15 | SS400 | Powder Coating | B | A |
| NO. II-426 | Example II-16 | SS400 | Powder Coating | C | A |
| NO. II-427 | Example II-17 | SS400 | Powder Coating | C | A |
| NO. II-428 | Example II-18 | SS400 | Powder Coating | B | A |
| NO. II-429 | Example II-19 | SS400 | Powder Coating | B | A |
| NO. II-430 | Example II-20 | SS400 | Powder Coating | B | A |
| NO. II-431 | Example II-21 | SS400 | Powder Coating | C | A |
| NO. II-432 | Example II-22 | SS400 | Powder Coating | A | A |
| NO. II-433 | Example II-23 | SS400 | Powder Coating | B | A |
| NO. II-434 | Example II-24 | SS400 | Powder Coating | B | A |
| NO. II-435 | Example II-25 | SS400 | Powder Coating | B | A |
| NO. II-436 | Example II-26 | SS400 | Powder Coating | B | A |
| NO. II-437 | Example II-27 | SS400 | Powder Coating | B | A |
| NO. II-438 | Example II-28 | SS400 | Powder Coating | B | A |
| NO. II-439 | Example II-29 | SS400 | Powder Coating | B | A |
| NO. II-440 | Example II-30 | SS400 | Powder Coating | B | A |
| NO. II-441 | Example II-31 | SS400 | Powder Coating | B | A |
| NO. II-442 | Example II-32 | SS400 | Powder Coating | B | A |
| NO. II-443 | Example II-33 | SS400 | Powder Coating | B | A |
| NO. II-444 | Example II-34 | SS400 | Powder Coating | B | A |
| NO. II-445 | Example II-35 | SS400 | Powder Coating | B | A |
| NO. II-446 | Example II-36 | SS400 | Powder Coating | B | A |
| NO. II-447 | Example II-37 | SS400 | Powder Coating | B | A |
| NO. II-448 | Example II-38 | SS400 | Powder Coating | B | A |
| NO. II-449 | Example II-39 | SS400 | Powder Coating | B | A |
| NO. II-450 | Example II-40 | SS400 | Powder Coating | B | A |
| NO. II-451 | Example II-41 | SS400 | Powder Coating | B | A |
| NO. II-452 | Example II-42 | SS400 | Powder Coating | B | A |
| NO. II-453 | Example II-43 | SS400 | Powder Coating | B | A |
| NO. II-454 | Example II-44 | SS400 | Powder Coating | B | A |
| NO. II-455 | Example II-45 | SS400 | Powder Coating | B | A |
| NO. II-456 | Example II-46 | SS400 | Powder Coating | B | A |
| NO. II-457 | Example II-47 | SS400 | Powder Coating | B | A |
| NO. II-458 | Example II-48 | SS400 | Powder Coating | B | A |

TABLE 5-12

| Film coated metal materials | Chemical conversion treatment agent | Metal material | Film coating | Corrosion resistance | Adhesion |
| --- | --- | --- | --- | --- | --- |
| NO. II-459 | Example II-49 | SS400 | Powder Coating | B | A |
| NO. II-460 | Example II-50 | SS400 | Powder Coating | B | A |
| NO. II-461 | Example II-51 | SS400 | Powder Coating | B | A |

TABLE 5-12-continued

| Film coated metal materials | Chemical conversion treatment agent | Metal material | Film coating | Corrosion resistance | Adhesion |
|---|---|---|---|---|---|
| NO. II-462 | Example II-52 | SS400 | Powder Coating | B | A |
| NO. II-463 | Example II-53 | SS400 | Powder Coating | B | A |
| NO. II-464 | Example II-54 | SS400 | Powder Coating | B | A |
| NO. II-465 | Example II-55 | SS400 | Powder Coating | B | A |
| NO. II-466 | Example II-56 | SS400 | Powder Coating | A | A |
| NO. II-467 | Example II-57 | SS400 | Powder Coating | A | A |
| NO. II-468 | Example II-58 | SS400 | Powder Coating | B | A |
| NO. II-469 | Example II-59 | SS400 | Powder Coating | A | A |
| NO. II-470 | Example II-60 | SS400 | Powder Coating | A | A |
| NO. II-471 | Example II-61 | SS400 | Powder Coating | A | S |
| NO. II-472 | Example II-62 | SS400 | Powder Coating | B | A |
| NO. II-473 | Example II-63 | SS400 | Powder Coating | B | A |
| NO. II-474 | Example II-64 | SS400 | Powder Coating | B | A |
| NO. II-475 | Example II-65 | SS400 | Powder Coating | A | A |
| NO. II-476 | Example II-66 | SS400 | Powder Coating | A | A |
| NO. II-477 | Example II-67 | SS400 | Powder Coating | A | A |
| NO. II-478 | Example II-68 | SS400 | Powder Coating | A | A |
| NO. II-479 | Example II-69 | SS400 | Powder Coating | B | A |
| NO. II-480 | Example II-70 | SS400 | Powder Coating | B | A |
| NO. II-481 | Example II-71 | SS400 | Powder Coating | B | A |
| NO. II-482 | Example II-72 | SS400 | Powder Coating | A | S |
| NO. II-483 | Example II-73 | SS400 | Powder Coating | A | S |
| NO. II-484 | Example II-74 | SS400 | Powder Coating | A | A |
| NO. II-485 | Example II-75 | SS400 | Powder Coating | A | S |
| NO. II-486 | Example II-76 | SS400 | Powder Coating | S | S |
| NO. II-487 | Example II-77 | SS400 | Powder Coating | A | S |
| NO. II-488 | Example II-78 | SS400 | Powder Coating | A | S |
| NO. II-489 | Example II-79 | SS400 | Powder Coating | A | S |
| NO. II-490 | Example II-80 | SS400 | Powder Coating | A | S |
| NO. II-491 | Example II-81 | SS400 | Powder Coating | A | S |
| NO. II-492 | Example II-82 | SS400 | Powder Coating | A | S |

TABLE 5-13

| Film coated metal materials | Pretreatment agent | Chemical conversion treatment agent | Metal material | Film coating | Corrosion resistance | Adhesion |
|---|---|---|---|---|---|---|
| NO. II-493 | Example 3 | Example II-4 | SPCC | Electrodeposition coating | S | S |
| NO. II-494 | Example 3 | Example II-6 | SPCC | Electrodeposition coating | A | A |
| NO. II-495 | Example 3 | Example II-59 | SPCC | Electrodeposition coating | S | S |
| NO. II-496 | Example 11 | Example II-4 | SPCC | Electrodeposition coating | S | S |
| NO. II-497 | Example 11 | Example II-6 | SPCC | Electrodeposition coating | S | S |
| NO. II-498 | Example 11 | Example II-59 | SPCC | Electrodeposition coating | S | S |
| NO. II-499 | Example 59 | Example II-4 | SPCC | Electrodeposition coating | S | S |
| NO. II-500 | Example 59 | Example II-6 | SPCC | Electrodeposition coating | S | S |
| NO. II-501 | Example 59 | Example II-59 | SPCC | Electrodeposition coating | S | S |
| NO. II-502 | Example 69 | Example II-4 | SPCC | Electrodeposition coating | S | S |
| NO. II-503 | Example 69 | Example II-6 | SPCC | Electrodeposition coating | S | S |
| NO. II-504 | Example 69 | Example II-59 | SPCC | Electrodeposition coating | S | S |
| NO. II-505 | Example 3 | Example II-4 | SPCC | Solvent Coating | S | S |
| NO. II-506 | Example 3 | Example II-6 | SPCC | Solvent Coating | A | A |
| NO. II-507 | Example 3 | Example II-59 | SPCC | Solvent Coating | S | S |
| NO. II-508 | Example 11 | Example II-4 | SPCC | Solvent Coating | S | S |
| NO. II-509 | Example 11 | Example II-6 | SPCC | Solvent Coating | S | S |
| NO. II-510 | Example 11 | Example II-59 | SPCC | Solvent Coating | S | S |
| NO. II-511 | Example 59 | Example II-4 | SPCC | Solvent Coating | S | S |
| NO. II-512 | Example 59 | Example II-6 | SPCC | Solvent Coating | S | S |
| NO. II-513 | Example 59 | Example II-59 | SPCC | Solvent Coating | S | S |
| NO. II-514 | Example 69 | Example II-4 | SPCC | Solvent Coating | S | S |
| NO. II-515 | Example 69 | Example II-6 | SPCC | Solvent Coating | S | A |
| NO. II-516 | Example 69 | Example II-59 | SPCC | Solvent Coating | S | S |
| NO. II-517 | Example 3 | Example II-4 | SPCC | Powder Coating | S | S |
| NO. II-518 | Example 3 | Example II-6 | SPCC | Powder Coating | A | A |
| NO. II-519 | Example 3 | Example II-59 | SPCC | Powder Coating | S | S |
| NO. II-520 | Example 11 | Example II-4 | SPCC | Powder Coating | S | S |
| NO. II-521 | Example 11 | Example II-6 | SPCC | Powder Coating | S | S |
| NO. II-522 | Example 11 | Example II-59 | SPCC | Powder Coating | S | S |
| NO. II-523 | Example 59 | Example II-4 | SPCC | Powder Coating | S | S |
| NO. II-524 | Example 59 | Example II-6 | SPCC | Powder Coating | S | S |
| NO. II-525 | Example 59 | Example II-59 | SPCC | Powder Coating | S | S |

TABLE 5-13-continued

| Film coated metal materials | Pretreatment agent | Chemical conversion treatment agent | Metal material | Film coating | Corrosion resistance | Adhesion |
|---|---|---|---|---|---|---|
| NO. II-526 | Example 69 | Example II-4 | SPCC | Powder Coating | S | S |
| NO. II-527 | Example 69 | Example II-6 | SPCC | Powder Coating | S | A |
| NO. II-528 | Example 69 | Example II-59 | SPCC | Powder Coating | S | S |

TABLE 5-14

| Film coated metal materials | Pretreatment agent | Chemical conversion treatment agent | Metal material | Film coating | Corrosion resistance | Adhesion |
|---|---|---|---|---|---|---|
| NO. II-529 | Example 3 | Example II-4 | SS400 | Electrodeposition coating | B | A |
| NO. II-530 | Example 3 | Example II-6 | SS400 | Electrodeposition coating | B | B |
| NO. II-531 | Example 3 | Example II-59 | SS400 | Electrodeposition coating | A | S |
| NO. II-532 | Example 11 | Example II-4 | SS400 | Electrodeposition coating | B | A |
| NO. II-533 | Example 11 | Example II-6 | SS400 | Electrodeposition coating | B | A |
| NO. II-534 | Example 11 | Example II-59 | SS400 | Electrodeposition coating | A | S |
| NO. II-535 | Example 59 | Example II-4 | SS400 | Electrodeposition coating | A | A |
| NO. II-536 | Example 59 | Example II-6 | SS400 | Electrodeposition coating | B | A |
| NO. II-537 | Example 59 | Example II-59 | SS400 | Electrodeposition coating | S | S |
| NO. II-538 | Example 69 | Example II-4 | SS400 | Electrodeposition coating | B | A |
| NO. II-539 | Example 69 | Example II-6 | SS400 | Electrodeposition coating | B | A |
| NO. II-540 | Example 69 | Example II-59 | SS400 | Electrodeposition coating | A | S |
| NO. II-541 | Example 3 | Example II-4 | SS400 | Solvent Coating | B | A |
| NO. II-542 | Example 3 | Example II-6 | SS400 | Solvent Coating | B | B |
| NO. II-543 | Example 3 | Example II-59 | SS400 | Solvent Coating | A | A |
| NO. II-544 | Example 11 | Example II-4 | SS400 | Solvent Coating | B | A |
| NO. II-545 | Example 11 | Example II-6 | SS400 | Solvent Coating | B | A |
| NO. II-546 | Example 11 | Example II-59 | SS400 | Solvent Coating | A | A |
| NO. II-547 | Example 59 | Example II-4 | SS400 | Solvent Coating | A | A |
| NO. II-548 | Example 59 | Example II-6 | SS400 | Solvent Coating | A | A |
| NO. II-549 | Example 59 | Example II-59 | SS400 | Solvent Coating | A | S |
| NO. II-550 | Example 69 | Example II-4 | SS400 | Solvent Coating | B | A |
| NO. II-551 | Example 69 | Example II-6 | SS400 | Solvent Coating | B | A |
| NO. II-552 | Example 69 | Example II-59 | SS400 | Solvent Coating | A | A |
| NO. II-553 | Example 3 | Example II-4 | SS400 | Powder Coating | B | A |
| NO. II-554 | Example 3 | Example II-6 | SS400 | Powder Coating | B | A |
| NO. II-555 | Example 3 | Example II-59 | SS400 | Powder Coating | A | A |
| NO. II-556 | Example 11 | Example II-4 | SS400 | Powder Coating | A | A |
| NO. II-557 | Example 11 | Example II-6 | SS400 | Powder Coating | A | A |
| NO. II-558 | Example 11 | Example II-59 | SS400 | Powder Coating | A | A |
| NO. II-559 | Example 59 | Example II-4 | SS400 | Powder Coating | A | A |
| NO. II-560 | Example 59 | Example II-6 | SS400 | Powder Coating | A | A |
| NO. II-561 | Example 59 | Example II-59 | SS400 | Powder Coating | S | S |
| NO. II-562 | Example 69 | Example II-4 | SS400 | Powder Coating | B | A |
| NO. II-563 | Example 69 | Example II-6 | SS400 | Powder Coating | A | A |
| NO. II-564 | Example 69 | Example II-59 | SS400 | Powder Coating | A | A |

The invention claimed is:

1. A pretreatment agent, used as an agent in a pretreatment of a chemical conversion treatment performed for forming a chemical conversion coating on/over a surface of a metal material,
comprising:
 a metal alkoxide (A) containing at least one metal element selected from the group consisting of zirconium, titanium, vanadium, and aluminum;
 at least one sulfonic acid (B) selected from the group consisting of methanesulfonic acid, ethanesulfonic acid, hydroxymethanesulfonic acid, and hydroxyethanesulfonic acid, and
 at least one alkoxysilyl group-containing organosilane compound (C), wherein,
 when a metal-equivalent molar concentration of the metal alkoxide (A) is defined as $A_M$ and a molar concentration of the sulfonic acid contained in the pretreatment agent is defined at $B_M$,
 a molar concentration of $[B_M]/[A_M]$ is 2.0 or higher.

2. A method of producing a metal material, comprising a pretreatment step of contacting the pretreatment agent according to claim 1 on/over a surface of a metal material.

3. The method of producing a metal material according to claim 2, further comprising, a chemical conversion treatment step of forming a chemical conversion coating over the surface of the metal material, after the pretreatment step.

4. The method of producing a metal material according to claim 3, wherein the chemical conversion treatment step comprises a step of contacting a chemical conversion treatment agent, comprising a zirconium alkoxide (a) and a zirconium-containing ion supply source (b) and having a pH of 1.5 to 6.5, with the metal material.

5. A metal material having a chemical conversion coating, obtained by the method according to claim 3.

6. A method of producing a painted metal material, further comprising a painting step of painting the metal material, after the chemical conversion treatment step according to claim 3.

7. A painted metal material having a paint film, the paint film comprising over a surface of the metal material having a chemical conversion coating according to claim 5.

* * * * *